United States Patent
Mi et al.

(10) Patent No.: US 8,508,910 B2
(45) Date of Patent: Aug. 13, 2013

(54) MEMS DEVICE

(75) Inventors: Xiaoyu Mi, Kawasaki (JP); Osamu Toyoda, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 13/039,644

(22) Filed: Mar. 3, 2011

(65) Prior Publication Data

US 2011/0222204 A1 Sep. 15, 2011

(30) Foreign Application Priority Data

Mar. 11, 2010 (JP) ................................. 2010-054421

(51) Int. Cl.
*H01G 5/00* (2006.01)
*H01G 7/00* (2006.01)

(52) U.S. Cl.
USPC .......................................................... 361/277

(58) Field of Classification Search
USPC .......................... 361/277–278, 280–281, 290
See application file for complete search history.

(56) References Cited

U.S. PATENT DOCUMENTS

| 7,471,031 | B2 | 12/2008 | Kawakubo | |
|---|---|---|---|---|
| 2003/0161091 | A1* | 8/2003 | Devoe et al. | 361/321.2 |
| 2005/0024161 | A1* | 2/2005 | Qiu et al. | 333/105 |
| 2005/0168910 | A1 | 8/2005 | Won et al. | 361/277 |
| 2005/0180089 | A1 | 8/2005 | Nakayama | |
| 2008/0238257 | A1 | 10/2008 | Kawakubo et al. | 310/328 |

FOREIGN PATENT DOCUMENTS

| EP | 1 343 189 | 9/2003 |
|---|---|---|
| JP | 2003-124063 A1 | 4/2003 |
| JP | 2004-172504 | 6/2004 |
| JP | 2006-93463 A1 | 4/2006 |

OTHER PUBLICATIONS

Extended European Search Report dated Jun. 28, 2011 for corresponding European patent application No. 11154797.2.
D. Peroulis, et al.; "Tunable Lumped Components with Applications to Reconfigurable MEMS Filters;" 2001 IEEE MTT-S Digest; 2001; pp. 341-344 and two cover sheets (6 Sheets total)/p. 2 of specification.
E. Fourn, et al.; "MEMS Switchable Interdigital Coplanar Filter;" IEEE Transactions on Microwave Theory and Techniques; vol. 51; No. 1; Jan. 2003; pp. 320-324 and two cover sheets (7 Sheets total)/p. 2 of specification.
A.A. Tamijani, et al.; "Miniature and Tunable Filters Using MEMS Capacitors;" IEEE Transactions on Microwave Theory and Techniques; vol. 51; No. 7; Jul. 2003; pp. 1878-1885 and two cover sheets (10 Sheets total)/p. 2 of specification.

* cited by examiner

*Primary Examiner* — Eric Thomas
(74) *Attorney, Agent, or Firm* — Kratz, Quintos & Hanson, LLP

(57) ABSTRACT

A MEMS device includes a substrate, a fixed electrode that is provided on the substrate and allows a signal to pass therethrough, a movable electrode that is provided above the substrate in a manner to face the fixed electrode and allows a signal to pass therethrough, a driving line that is provided inside the substrate and used to apply a driving voltage to displace the movable electrode, and a resistance that is provided in a first via hole formed inside the substrate and used to cutoff a signal. The fixed electrode or the movable electrode is connected to the driving line through the first resistance.

4 Claims, 22 Drawing Sheets

MEMS DEVICE

CROSS-REFERENCE TO RELATED APPLICATION

This application is based upon and claims the benefit of priority of the prior Japanese Patent Application No. 2010-054421, filed on Mar. 11, 2010, the entire contents of which are incorporated herein by reference.

FIELD

The embodiments discussed herein are related to a MEMS (Micro Electro Mechanical System) device fabricated, for example, by using MEMS technologies.

BACKGROUND

In recent years, the market of mobile communication systems such as cellular phones has been expanding, and the functionality provided by the service thereof has been becoming sophisticated.

Along with this development, the frequencies used for the mobile communications are gradually shifting toward higher frequency bands of gigahertz (GHz) or higher and, at the same time, tend to involve multi-channels. In addition to this, a future possibility of the introduction of Software-Defined-Radio (SDR) technologies is actively discussed.

A MEMS device fabricated using MEMS technologies is attracting attention as a tunable high-frequency device. The MEMS device has advantages of attaining a high Q (quality factor), and thus various kinds of MEMS devices are proposed. The following documents are examples that propose such MEMS devices: D. Peroulis et al, "Tunable Lumped Components with Applications to Reconfigurable MEMS Filters", 2001 IEEE MTT-S Digest, p 341-344; E. Fourn et al., "MEMS Switchable Interdigital Coplanar Filter", IEEE Trans. Microwave Theory Tech., vol. 51, NO. 1, p 320-324, January 2003; and "A. A. Tamijani et al, "Miniature and Tunable Filters Using MEMS Capacitors", IEEE Trans. Microwave Theory Tech., vol. 51, NO. 7, p 1878-1885, July 2003".

A variable capacitor is one of such MEMS devices.

FIGS. 20A and 20B are diagrams illustrating an example in which a variable capacitor 4 is adopted.

Referring to FIG. 20A, variable capacitors 4a to 4c are connected to one another on a signal line 1 with resonators 2a and 2b interposed therebetween. This means that the variable capacitors 4a to 4c are used as coupling capacitors for coupling the resonators 2a and 2b to each other.

In FIG. 20B, variable capacitors 4d and 4e are connected in parallel with each other between the signal line 1 and the ground to thereby form a π-type resonant circuit together with an inductor 3.

"A. A. Tamijani et al, "Miniature and Tunable Filters Using MEMS Capacitors", IEEE Trans. Microwave Theory Tech., vol. 51, NO. 7, p 1878-1885, July 2003" discloses a MEMS variable filter having a structure in which MEMS variable capacitors are arranged to straddle a CPW (Coplanar Waveguide) to thereby form a variable distributed constant line resonator, and a plurality of variable distributed constant line resonators are connected in series.

FIGS. 21A and 21B illustrate a conventional and ordinary variable capacitor 80. FIG. 21A is a plan view, and FIG. 21B is a cross sectional view taken along a line X-X.

As illustrated in FIGS. 21A and 21B, the variable capacitor 80 includes, on a substrate 81, a fixed electrode 82, a movable electrode 84, anchor portions 85a and 85b, an input signal line 86 through which a high-frequency signal is input, an output signal line 87 through which the high-frequency signal is output, and so on.

The input signal line 86 is connected to the fixed electrode 82. The output signal line 87 is provided with branch lines 87a and 87b and connected to the movable electrode 84 through the branch lines 87a and 87b, and the anchor portions 85a and 85b.

A driving line DL and a ground line GL are provided inside the substrate 81. The fixed electrode 82 is connected to the driving line DL through a via 88a.

The movable electrode 84 is connected to the ground line GL through the anchor portions 85a and 85b, the branch lines 87a and 87b, and the vias 88b and 88c. With this arrangement, a driving voltage can be supplied between the fixed electrode 82 and the movable electrode 84.

In this way, the fixed electrode 82 and the movable electrode 84 serve not only as a function of a capacitance electrode of the variable capacitor 80 but also as a driving electrode.

Here, when the driving voltage is supplied between the two electrodes, i.e., the fixed electrode 82 and the movable electrode 84, a distance between the two electrodes changes by an action of electrostatic attractive force, and a capacitance of the variable capacitor 80 changes.

FIGS. 22A and 22B illustrate also a conventional and ordinary variable capacitor 90. FIG. 22A is a plan view, and FIG. 22B is a cross sectional view taken along a line Y-Y.

As illustrated in FIGS. 22A and 22B, the variable capacitor 90 is different from the variable capacitor 80 in that driving electrodes 91a and 91b are provided independently from a fixed electrode 82, and driving electrodes 91a and 91b are connected to a driving line DL through vias 88d and 88e.

In addition, Japanese Laid-open Patent Publication No. 2006-093463 proposes a variable-capacitance capacitor provided with a movable head portion in which a plurality of movable electrodes are arranged, a plurality of fixed electrodes formed on a surface of a substrate and facing the movable electrodes, and a piezoelectric driving portion coupled to the movable head portion and having one end thereof fixed to the substrate.

In addition, Japanese Laid-open Patent Publication No. 2003-124063 proposes a variable-capacitance capacitor device provided with an insulating substrate including at least two capacitor electrodes provided on a principal surface of the insulating substrate in a state where insulation from each other is maintained; an actuator formed of an insulating material, having an external shape straddling the individual capacitor electrodes, and a conductor constituting individual capacitors formed between the conductor and the capacitor electrodes; and driving means that causes the actuator to operate to come into contact with or come off from the principal surface of the insulating substrate.

The conventional MEMS device has a drawback in which, when the device is applied to a high-frequency circuit, a loss in the high-frequency signal is caused.

For example, in the variable capacitor 80 illustrated in FIGS. 21A and 21B, there are cases in which the high-frequency signal fed to the fixed electrode 82 leaks to the driving line DL. In addition, in the variable capacitor 90 illustrated in FIGS. 22A and 22B, there are cases in which the high-frequency signal leaks to the driving line DL due to a parasitic capacitance formed between the driving electrodes 91a and 91b and peripheral circuits.

Conventionally, this has been dealt with by inputting the high-frequency signal and the driving voltage through a bias-T circuit. However, such a measure is not sufficient enough to prevent the high-frequency signal from leaking.

SUMMARY

According to an aspect of the invention, a MEMS device described hereinafter includes a substrate, a fixed electrode that is provided on the substrate and allows a signal to pass therethrough, a movable electrode that is provided above the substrate in a manner to face the fixed electrode and allows a signal to pass therethrough, a driving line that is provided inside the substrate and used to apply a driving voltage to displace the movable electrode, and a first resistance that is provided in a first via hole formed inside the substrate and used to cutoff a signal. The fixed electrode or the movable electrode is connected to the driving line through the first resistance.

Alternatively, according to another aspect of the invention, a MEMS device includes a substrate, a fixed electrode that is provided on the substrate and allows a signal to pass therethrough, a movable electrode that is provided above the substrate in a manner to face the fixed electrode and allows a signal to pass therethrough, a driving line that is provided inside the substrate and used to apply a driving voltage to displace the movable electrode, a first resistance that is provided in a first via hole formed inside the substrate and used to cutoff a signal, and a driving electrode that is provided on the substrate in a manner to face the movable electrode and connected to the driving line through the first resistance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
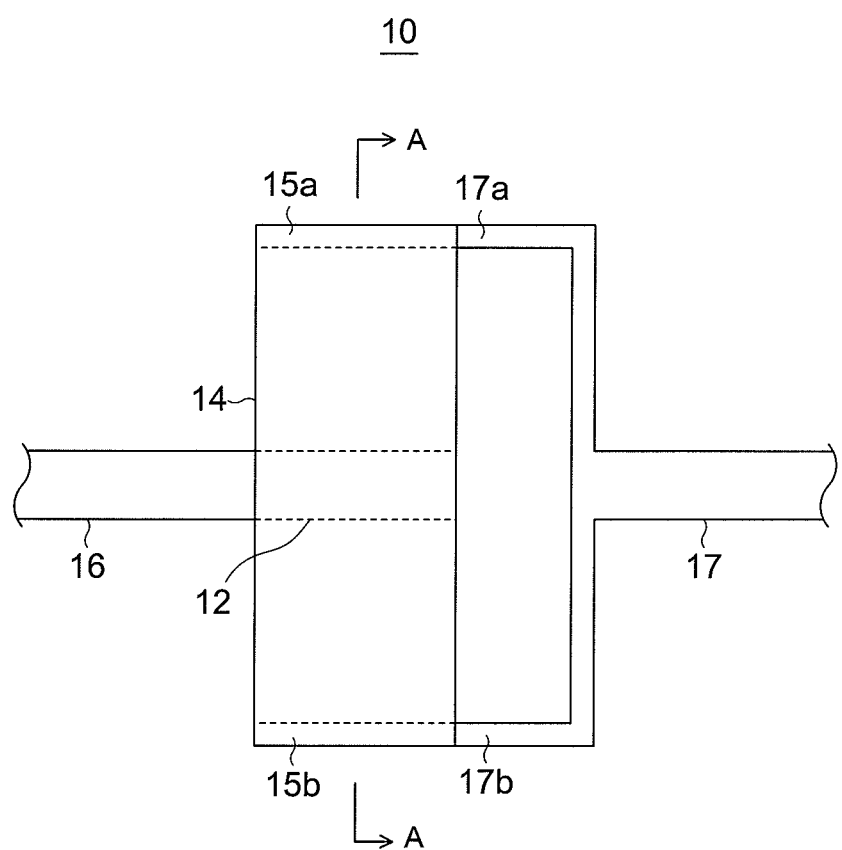
FIG. 1 is a plan view illustrating an example of a variable capacitor according to a first embodiment.

Preferred embodiments of the present invention will be explained below with reference to the accompanying drawings. The embodiments are examples and various modifications may be made to the structure, the shape, the size, the material, and the like of MEMS capacitors of the embodiments.

In the drawings referred to in the description below, the ratio of dimensions of each portion may be illustrated differently from the actual ratio so that the structure of the variable capacitor or the structure inside the substrate can be easily understood. Further, the substrate is omitted from the plan views.

First Embodiment

Figure 2A:
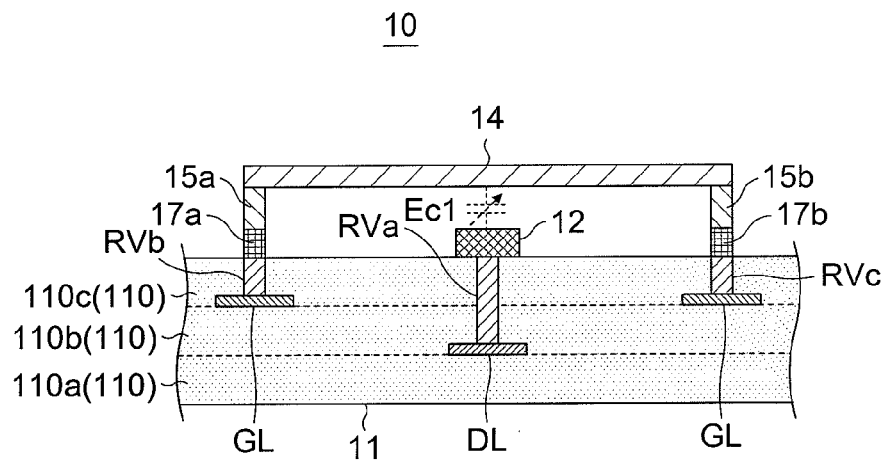
FIGS. 2A and 2B are cross sectional views of the variable capacitor illustrated in FIG. 1.
Figure 2B:
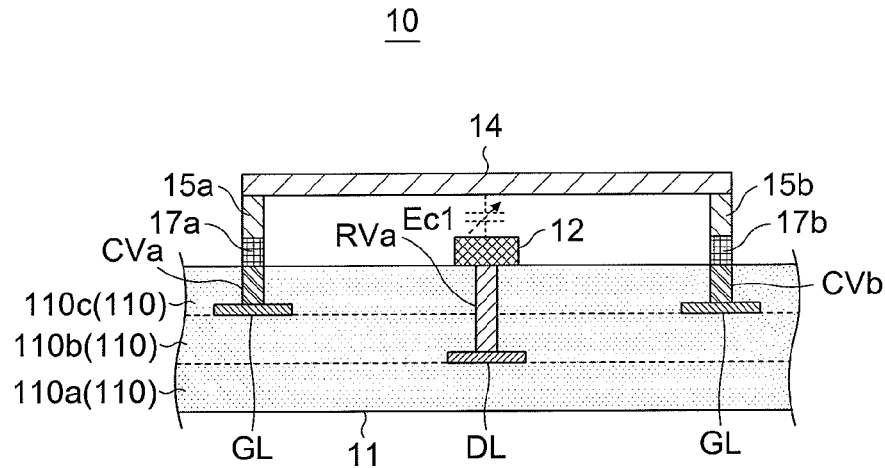

FIG. 1 is a plan view illustrating an example of a variable capacitor 10 according to a first embodiment, and FIGS. 2A and 2B are cross sectional views of the variable capacitor 10 taken along a line A-A in FIG. 1.

As illustrated in FIGS. 1, 2A, and 2B, the variable capacitor 10 includes, on a substrate 11, a fixed electrode 12, a movable electrode 14, anchor portions 15a and 15b, a first signal line 16, a second signal line 17, and so on.

The substrate 11 has a multi-layered structure formed of a plurality of insulating layers. The substrate 11 is provided therein with a driving line DL and a ground line GL for supplying or applying a driving voltage. According to this embodiment, the substrate 11 has a structure in which three layers of insulating layers 110a, 110b, and 110c are formed; the driving line DL is formed between the insulating layers 110a and 110b; and the ground line GL is formed between the insulating layers 110b and 110c. Each thickness of the insulating layers 110a-110c ranges approximately between 10 μm and a few hundreds μm.

Hereinafter, when the insulating layers 110a-110c are described, they may be collectively referred to as "insulating layer 110".

For example, a Low Temperature Co-fired Ceramics (LTCC) substrate having multilayered internal wiring is used as the substrate 11.

The fixed electrode 12 is formed of a conductive material such as gold (Au), aluminum (Al), or copper (Cu) and formed on a surface of the substrate 11. However, an end portion of the first signal line 16 may be used as the fixed electrode 12. The fixed electrode 12 serves, for example, as a part of a signal line in the high-frequency circuit.

The movable electrode 14 is formed of a conductive material such as gold (Au), aluminum (Al), or copper (Cu) and formed above the substrate 11 in bridge formation in such a manner that a center thereof faces the fixed electrode 12 with a gap interposed therebetween. The movable electrode 14 is supported by the anchor portions 15a and 15b in a beam supporting manner at both ends thereof. The movable electrode 14 serves, for example, as a part of a signal line in the high-frequency circuit.

The anchor portions 15a and 15b are formed of a conductive material such as gold (Au), aluminum (Al), or copper (Cu) and formed on upper faces of parts of branch lines 17a and 17b in an extending direction thereof in such a manner to support the movable electrode 14 at both ends thereof.

The first signal line 16 is formed on the surface of the substrate 11 in such a manner to extend in a direction orthogonally crossing a direction in which the movable electrode is arranged in bridge formation, and connected to the fixed electrode 12.

The second signal line 17 includes the branch lines 17a and 17b, is formed on the surface of the substrate 11 in such a manner to extend in a direction identical with a direction in which the first signal line 16 extends, and connected to the movable electrode 14 through the branch lines 17a and 17b and the anchor portions 15a and 15b.

The first signal line 16 and the second signal line 17 constitute a so-called microstrip line together with the ground line GL etc.

In this embodiment, it is assumed that the variable capacitor 10 is connected to the high-frequency circuit so that the first signal line 16 serves as the input side of the high-frequency signal, and the second signal line 17 serves as the output side of the high-frequency signal. However, it is also possible to connect the variable capacitor 10 so that the input and output sides of the high-frequency signal are arranged in an opposite manner. This also applies to the variable capacitors described in other embodiments later. In this embodiment, the frequency of the signal is assumed to be 1 MHz or higher as the high-frequency signal.

As illustrated in FIGS. 2A and 2B, the fixed electrode 12 and the movable electrode 14 are individually connected to the lines provided inside the substrate 11. However, there are two patterns for such connection. FIG. 2A illustrates a first connection pattern, and FIG. 2B illustrates a second connection pattern.

In the first connection pattern illustrated in FIG. 2A, the fixed electrode 12 is connected to the driving line DL through a via resistance RVa provided immediately beneath the fixed electrode 12 and inside the substrate 11. Further, the movable electrode 14 is connected to the ground line GL through the anchor portions 15a and 15b, the branch lines 17a and 17b, and via resistances RVb and RVc provided beneath the branch lines 17a and 17b, respectively.

To put it differently, the fixed electrode 12 and the driving line DL are connected together by the via resistance RVa in a shortest distance, and the branch lines 17a and 17b and the ground line GL are connected together by the via resistances RVb and RVc, respectively, in a shortest distance.

In the second connection pattern illustrated in FIG. 2B, the fixed electrode 12 is connected to the driving line DL through the via resistance RVa provided inside the substrate 11 and beneath the fixed electrode 12. Further, the movable electrode 14 is connected to the ground line GL through the anchor portions 15a and 15b, the branch lines 17a and 17b, and conductor vias CVa and CVb provided immediately beneath the branch lines 17a and 17b, respectively and inside the substrate 11.

To put it differently, the fixed electrode 12 and the driving line DL are connected together by the via resistance RVa in a shortest distance, and the branch lines 17a and 17b and the ground line GL are connected together by the conductor vias CVa and CVb, respectively, in a shortest distance.

This means that the only difference between the first connection pattern and the second connection pattern is that either the via resistances RVb and RVc or the conductor vias CVa and CVb are interposed between the movable electrode 14 and the ground line GL, and the rests are the same.

In either of the connection patterns, the fixed electrode 12 and the movable electrode 14 serve as not only a function of a capacitance electrode of the variable capacitor 10 but also a function of the driving electrode.

Figure 20A:
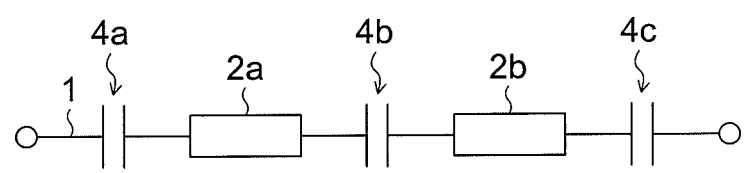
FIGS. 20A and 20B are diagrams illustrating an example in which a variable capacitor is adopted.
Figure 20B:
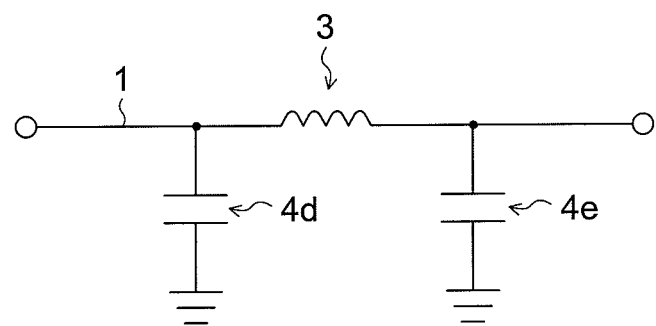
Figure 21A:
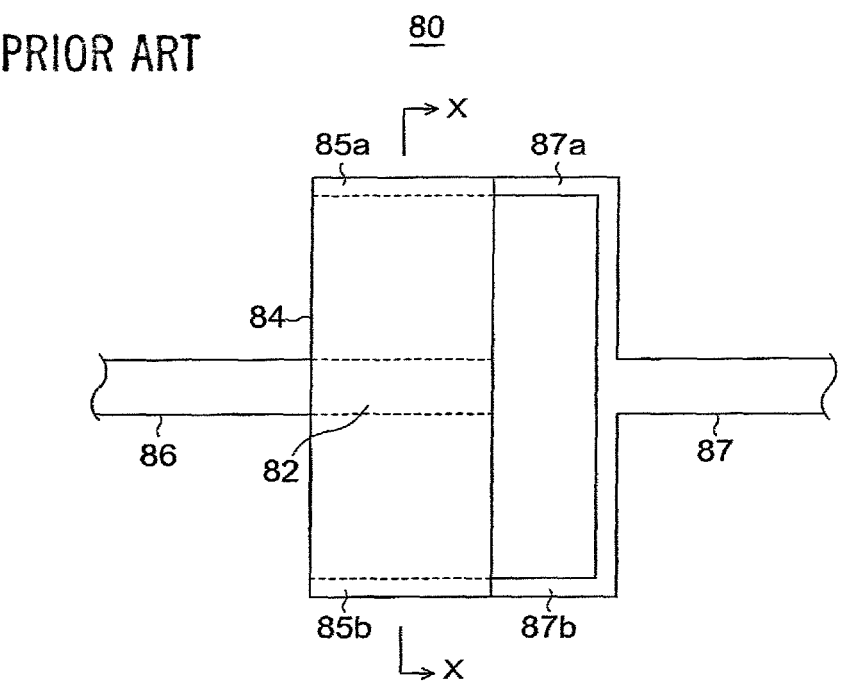
FIGS. 21A and 21B are diagrams illustrating a conventional and ordinary variable capacitor.
Figure 21B:
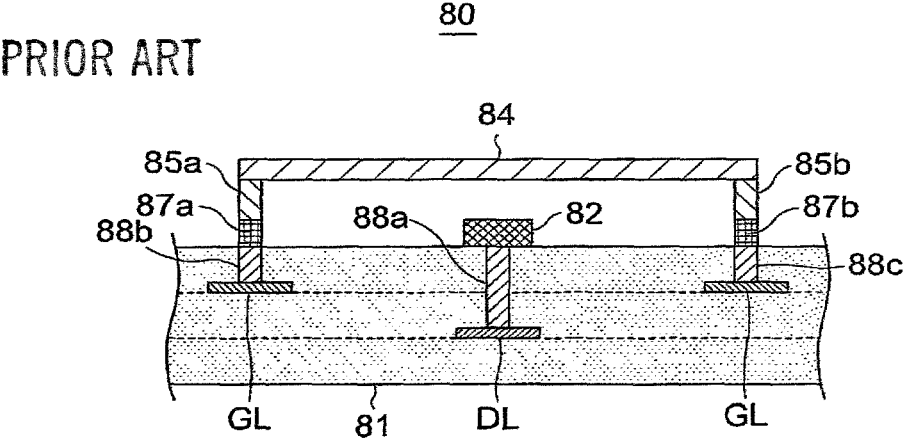
Figure 22A:
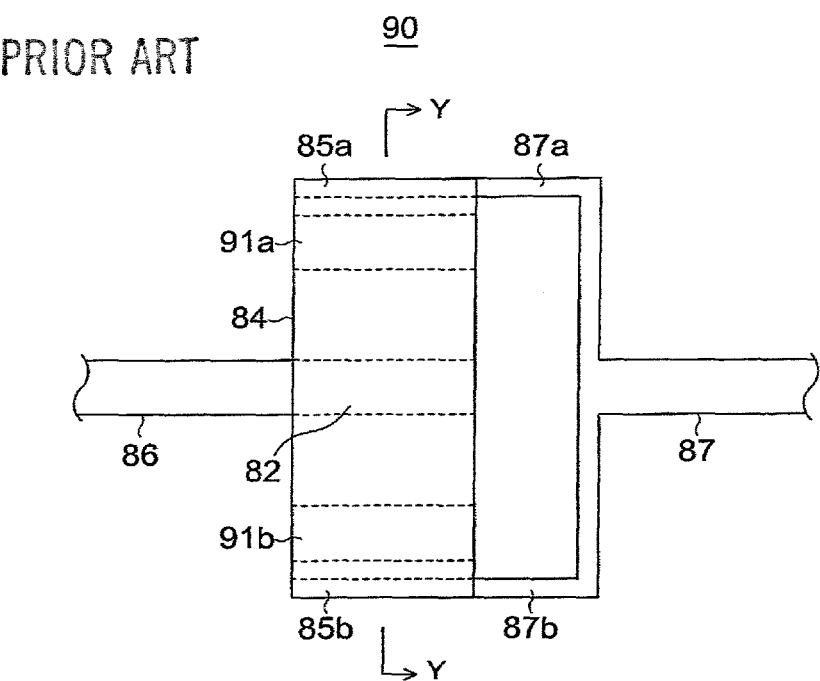
FIGS. 22A and 22B are diagrams illustrating a conventional and ordinary variable capacitor.
Figure 22B:
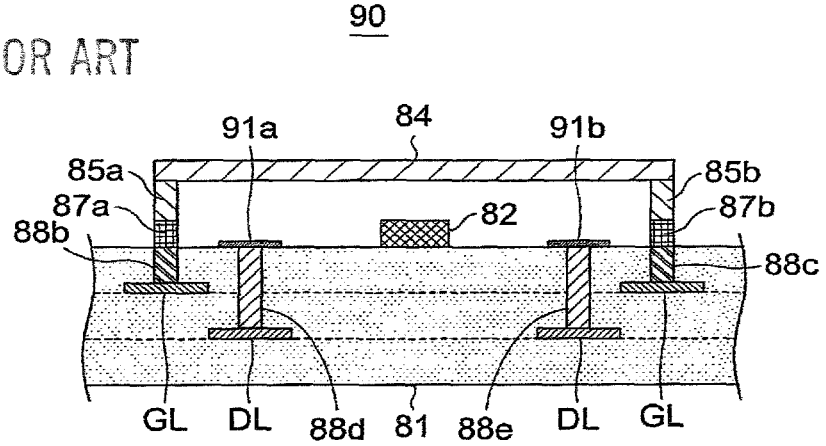

The first connection pattern is a pattern in which the variable capacitors 10 are connected in series with respect to the signal line 1, for example, as represented by the variable capacitors 4a-4c illustrated in FIG. 20A. The second connection pattern is a pattern in which the variable capacitors 10 are connected in parallel with respect to the signal line 1, for example, as represented by the variable capacitors 4d and 4e illustrated in FIG. 20B.

Hereinafter, when a matter common to the via resistances RVa-RVc is described, they may be collectively referred to as "via resistance RV". The same is also applied to the conductor vias CVa and CVb, and they may be collectively referred to as "conductor via CV".

The via resistance RV is a resistance element that is formed in a via hole penetrating through the insulating layer 110, which is formed of a single or a plurality of layers, of the substrate 11. In this embodiment, the via resistance RVa is formed in a manner to penetrate through the insulating layers 110b and 110c both in the first and second connection patterns. In addition, in the first connection pattern, the via resistances RVb and RVc are formed in a manner to penetrate through the insulating layer 110c.

The via resistance RV has a columnar shape with a diameter ranging from 50 to 200 μm. The ratio between the thickness of the insulating layer 110 and the diameter of the via resistance RV is, for example, approximately 1:1 to 2:1. The resistance value (impedance value) of the via resistance RV is such a value that is sufficient to shut off the high-frequency signal in principle. For example, when the characteristic impedance of the line is about 50 ohms, the resistance value of the via resistance RV is approximately a few hundreds ohms or larger, preferably 500 ohms or larger.

However, the resistance value of the via resistance RV may be adjusted arbitrarily in accordance with a type of a circuit to which the variable capacitor 10 is applied. In other words, the via resistance RV may be used not only for cutting off the high-frequency signal but also for other purposes. Consequently, individual values of the via resistances RVa-RVc may be identical to or different from each another. For example, in the first connection pattern, there is a case where the resistance values of the via resistances RVa-RVc may all be set to 500 ohms, or a case where the resistance value of the via resistance RVa is set to 500 ohms, and the resistance values of the via resistances RVb and RVc are set to a value higher or lower than 500 ohms.

The conductor via CV is a good conductor formed in the via hole penetrating through a single or a plurality of insulating layers 110 of the substrate 11. In this embodiment, in the second connection pattern, the conductor vias CVa and CVb are formed in a manner to penetrate through the insulating layer 110c.

The conductor via CV also has a columnar shape with, for example, a diameter of 50-200 μm. The resistance value (impedance value) thereof is such a value that is required for appropriately passing the high-frequency signal therethrough. For example, the value is approximately a few hundreds ohms or smaller.

The via resistance RV is produced in a manner described below when a Low Temperature Co-fired Ceramics (LTCC) substrate is used as the substrate 11.

Specifically, a green sheet to be used as the insulating layer 110 having a predetermined size is prepared, and a through hole (via hole) having, for example, a diameter of 50-200 μm is bored by punching, laser, or the like at a position where the via resistance RV is formed.

Next, the through hole is filled with an appropriate resistant material by technique such as screen printing. The resistant material is decided upon in accordance with a resistance value etc. required for the via resistance RV. For example, metallic oxide is used as the resistant material. Alternatively, nickel-chromium (NiCr) alloy, nickel-iron-chromium (NiFeCr) alloy, tantalum nitride (Ta2N), or the like is used Next, when the via resistance RV connected to the through hole bored in the upper insulating layer 110 is formed, a conductor pattern or a resistance pattern is formed, by screen printing etc., to cover an upper portion of the through hole filled with the resistant material. Through this process, a so-called receiving land is formed between the upper and lower insulating layers 110 by which the through holes board in the two insulating layers 110 can be securely connected together.

Additionally, a conductor pattern etc. serving as the driving line DL and the ground line GL are formed by printing or the like to thereby produce a single layer of the insulating layer 110.

In a similar manner, a plurality of insulating layers 110 are produced and laminated together to form a lamination. After pressure is applied to the lamination, the lamination is sintered to complete the substrate 11 incorporating therein the via resistance RV.

The conductor via CV is also formed in a manner similar to the case of the via resistance RV. This means that, when the conductor via CV is formed, a conductor material is filled in the bored through hole instead of the resistant material.

In this way, when the LTCC is used as the substrate 11, the via resistance RV and the conductor via CV are formed simultaneously with sintering during a process of producing the LTCC.

Figure 3A:
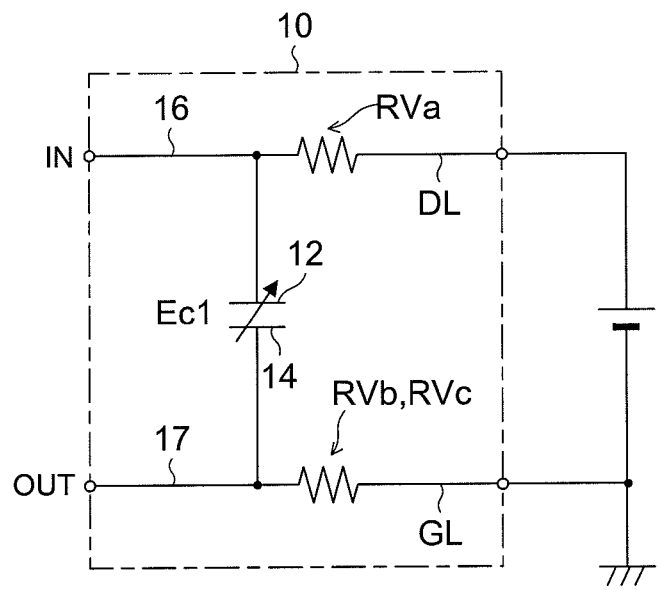
FIGS. 3A and 3B are diagrams illustrating equivalent circuits of the variable capacitor.
Figure 3B:
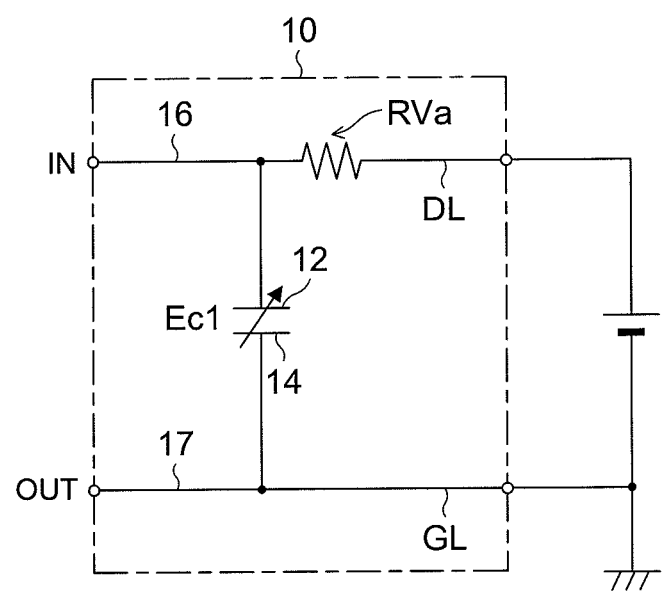

FIGS. 3A and 3B are diagrams illustrating equivalent circuits of a variable capacitor 10.

The variable capacitor 10 in the case of the first connection pattern can be expressed in a form of the equivalent circuit as illustrated in FIG. 3A.

Specifically, the fixed electrode 12 is connected to the first signal line 16, and also connected to the driving line DL through the via resistance RVa.

Here, the via resistance RVa is provided very close to the fixed electrode 12, that is, immediately beneath the fixed electrode 12. For this reason, when the variable capacitor 10 is connected to the high-frequency circuit, a high-frequency signal fed to the first signal line 16 hardly flows into a side of the driving line DL. In other words, the high-frequency signal is cut off from the side of the driving line DL and applied, as is, to a side of the fixed electrode 12. Therefore, it is possible to efficiently prevent the high-frequency signal from leaking to the driving line DL.

Further, the movable electrode 14 is connected to the second signal line 17, and also connected to the ground line GL through the via resistances RVb and RVc.

Here, the via resistances RVb and RVc are provided very close to the movable electrode 14, that is, immediately beneath the branch lines 17a and 17b. For this reason, when the variable capacitor 10 is connected to the high-frequency circuit, a high-frequency signal applied to the movable electrode 14 hardly flows into a side of the ground line GL. In other words, the high-frequency signal is cut off from the side of the ground line GL and fed out, as is, to a side of the second signal line 17. Therefore, it is possible to efficiently prevent the high-frequency signal from leaking to the ground line GL.

The variable capacitor 10 in the case of the second connection pattern can be expressed in a form of the equivalent circuit as illustrated in FIG. 3B. This means that it can be expressed in a form of the equivalent circuit illustrated in FIG. 3A excluding the via resistances RVb and RVc.

In this case, since the via resistance RVa is provided very close to the fixed electrode 12, it is also possible to efficiently prevent the high-frequency signal from leaking to the driving line DL.

In the meantime, the variable capacitor 10 has a capacitance Ec1 between two electrodes, i.e., the fixed electrode 12 and the movable electrode 14.

When a driving voltage is applied to the fixed electrode 12 through the driving line DL, an electrostatic attractive force is caused between the two electrodes to thereby displace the movable electrode 14 toward the fixed electrode 12. This results in a change of the distance between the two electrodes, which changes the capacitance Ec1 of the variable capacitor 10. In other words, the capacitance Ec1 is a variable capacitance.

As described above, in the variable capacitor 10, the via resistance RV makes it possible to efficiently prevent the high-frequency signal from leaking to the driving line DL or the ground line GL.

Further, the via resistance RV is berried inside the substrate 11. This causes a smaller stray capacitance with respect to periphery circuits, and does not cause a harmful effect to the transmission of the high-frequency signal. In addition, space on the surface of the substrate 11 can be secured as in the conventional case.

In this embodiment, the fixed electrode 12 is connected to the driving line DL through the via resistance RV, and the movable electrode 14 is connected to the ground line GL through the via resistance RV or the conductor via CV. However, such connections can be made the other way around. In other words, it is also possible to connect the movable electrode 14 to the driving line DL through the via resistance RV and connect the fixed electrode 12 to the ground line GL through the via resistance RV or the conductor via CV.

Second Embodiment

Figure 4:
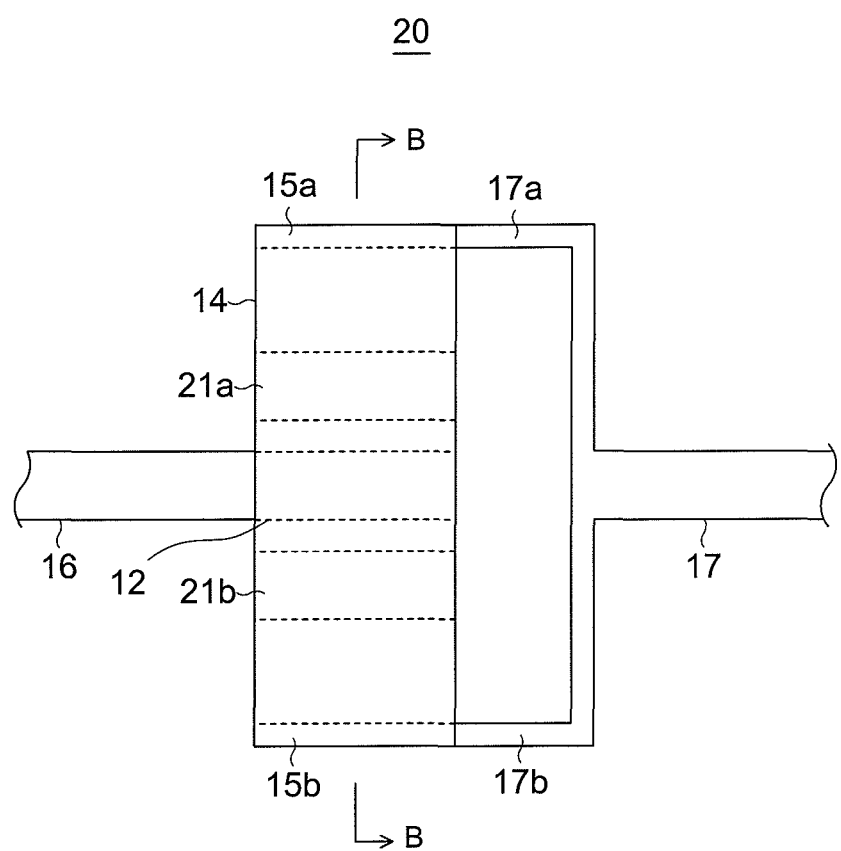
FIG. 4 is a plan view illustrating an example of a variable capacitor according to a second embodiment.
Figure 5A:
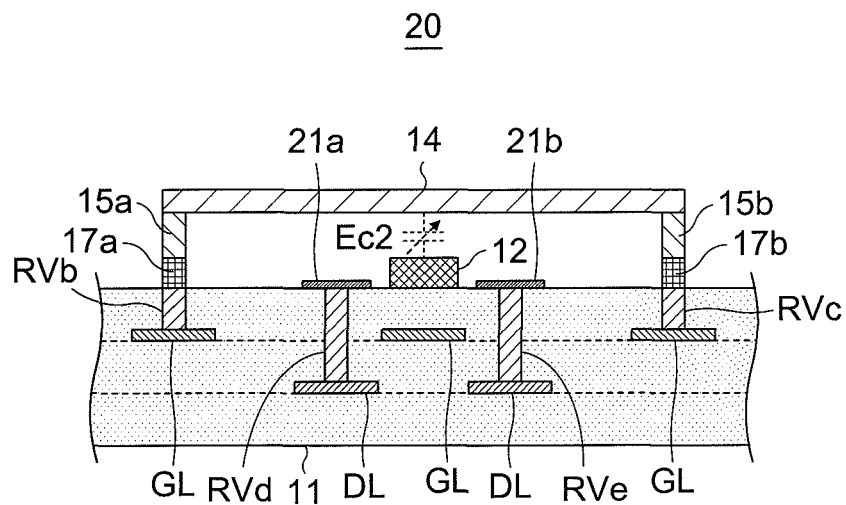
FIGS. 5A and 5B are cross sectional views of the variable capacitor illustrated in FIG. 4.
Figure 5B:
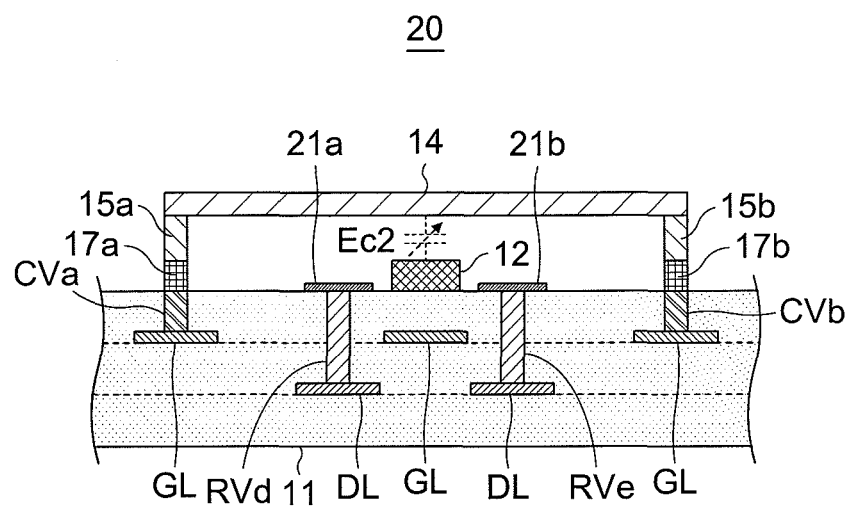

FIG. 4 is a plan view illustrating an example of a variable capacitor 20 according to a second embodiment, and FIGS. 5A and 5B are cross sectional views of the variable capacitor 20 taken along a line B-B in FIG. 4.

As illustrated in FIG. 4, and FIGS. 5A and 5B, the variable capacitor 20 is different from the variable capacitor 10 of the first embodiment in that, in the variable capacitor 20, driving electrodes 21a and 21b are provided separately from a fixed electrode 12. This means that variable capacitor 20 is different from the variable capacitor 10 of the first embodiment in the respect that it is a separate driving type.

Specifically, the fixed electrode 12 is not connected to a driving line DL, but the driving electrodes 21a and 21b are connected to the driving line DL through via resistances RVd and RVe. Accordingly, the via resistance RVa provided in the variable capacitor 10 is no longer required in the variable capacitor 20, and thus is not provided.

The other constitutional elements of the variable capacitor 20 are the same as those used in the variable capacitor 10 of the first embodiment. Therefore, such elements common to those already discussed are identified with the reference symbols identical to those used for describing the variable capacitor 10, and the description thereof will be omitted. This also applies to the description of variable capacitors of other embodiments which will be described later.

The driving electrodes 21a and 21b are formed of a conductive material such as gold (Au), aluminum (Al), or copper (Cu), and formed on a surface of a substrate 11 with the fixed electrode 12 interposed therebetween, i.e., provided individually adjacent to two sides of the fixed electrode 12. In this embodiment, although two driving electrodes 21a and 21b are provided, it is also possible to provide one, three, or more similar driving electrodes.

As illustrated in FIG. 5, the driving electrodes 21a and 21b are connected to the driving line DL through the via resistances RVd and RVe provided immediately beneath the driving electrodes 21a and 21b, respectively, and inside the substrate 11.

To put it differently, the driving electrode 21a and the driving line DL are connected together by the via resistance RVd in a shortest distance, and the driving electrode 21b and the driving line DL are connected together by the via resistance RVe in a shortest distance.

FIG. 5A illustrates a first connection pattern, and FIG. 5B illustrates a second connection pattern.

In either of the connection patterns, although the fixed electrode 12 serves as a function of a capacitance electrode of the variable capacitor 20, it does not serve as a function of the driving electrode. On the other hand, the movable electrode 14 serves as a function of a capacitance electrode of the variable capacitor 20 and also a function of a driving electrode.

Figure 6A:
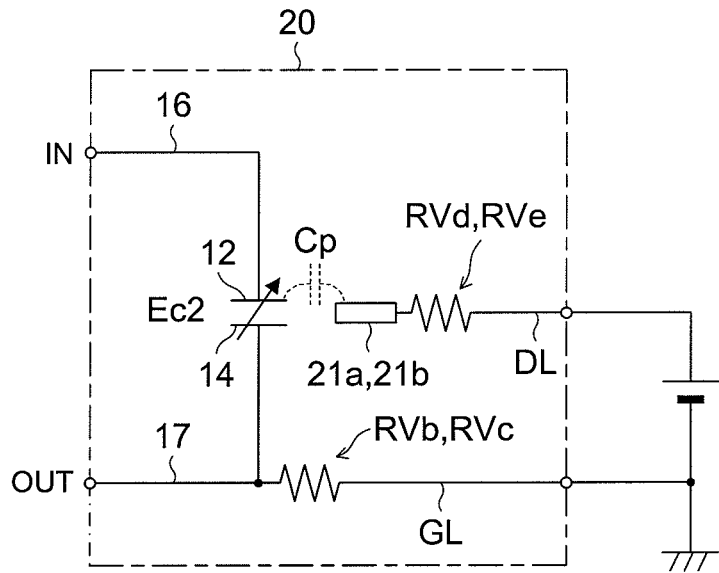
FIGS. 6A and 6B are diagrams illustrating equivalent circuits of the variable capacitor.
Figure 6B:
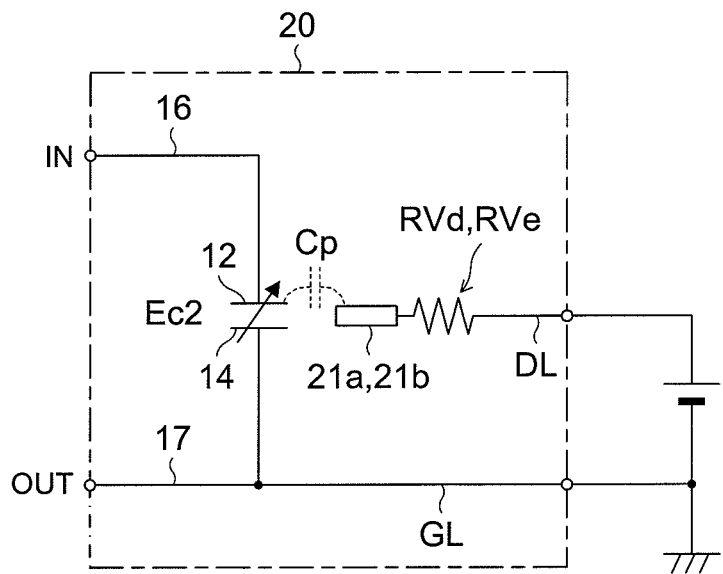

FIGS. 6A and 6B are diagrams illustrating the equivalent circuits of the variable capacitor 20.

The variable capacitor 20 in the case of the first connection pattern can be expressed in a form of the equivalent circuit as illustrated in FIG. 6A.

Specifically, the movable electrode 14 is connected to the second signal line 17 and, at the same time, is connected to the ground line GL through the via resistances RVb and RVc.

Here, the via resistances RVb and RVc are provided very close to the movable electrode 14, that is, immediately beneath the branch lines 17a and 17b. Therefore, it is possible to efficiently prevent the high-frequency signal from leaking to the ground line GL.

Referring to FIGS. 5A and 5B, the driving electrodes 21a and 21b are arranged close to the fixed electrode 12 so as to act upon the movable electrode 14 and connected to the driving line DL through the via resistances RVd and RVe.

Here, the driving electrodes 21a and 21b are not directly connected to the peripheral circuits such as other electrodes, signal lines, and lines. However, there are sometimes cases where the impedance thereof reduces due to a parasitic capacitance Cp caused between the driving electrodes 21a and 21b and the peripheral circuits, particularly between the driving electrodes 21a and 21b and the fixed electrode 12 disposed in close proximity thereto, and such a reduction in the impedance is not negligible.

Here, the via resistances RVd and RVe are provided very close to the driving electrodes 21a and 21b, respectively, that is, immediately beneath the driving electrodes 21a and 21b, respectively. Therefore, it is possible to efficiently prevent the high-frequency signal from leaking to the ground line GL even if the parasitic capacitance Cp is present.

The variable capacitor 20 in the second connection pattern can be expressed in a form of the equivalent circuit as illustrated in FIG. 6B. This means that it can be expressed in a form of the equivalent circuit illustrated in FIG. 6A excluding the via resistances RVb and RVc.

In such a case, since the via resistances RVd and RVe are arranged in positions very close to the driving electrodes 21a and 21b, respectively, it is possible to efficiently prevent the high-frequency signal from leaking to the driving line DL.

The variable capacitor 20 also includes a capacitance Ec2, which is a variable capacitance, between two electrodes of the fixed electrode 12 and the movable electrode 14 as in the case of the variable capacitor 10 of the first embodiment.

Third Embodiment

Figure 7A:
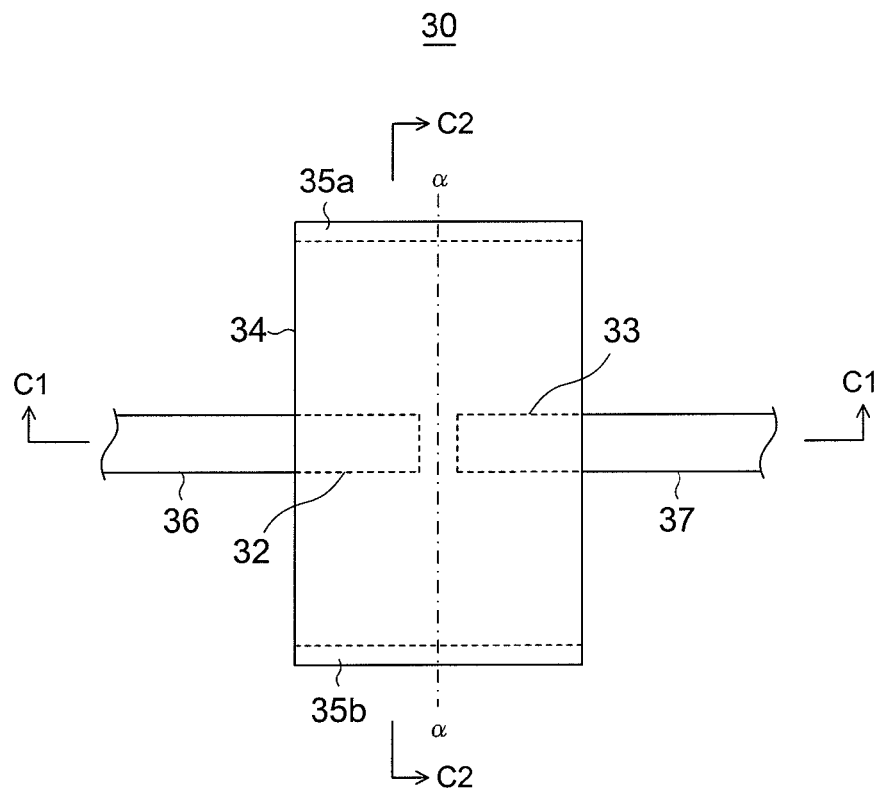
FIGS. 7A and 7B are a plan view and a cross sectional view, respectively, of an example of a variable capacitor according to a third embodiment.
Figure 7B:
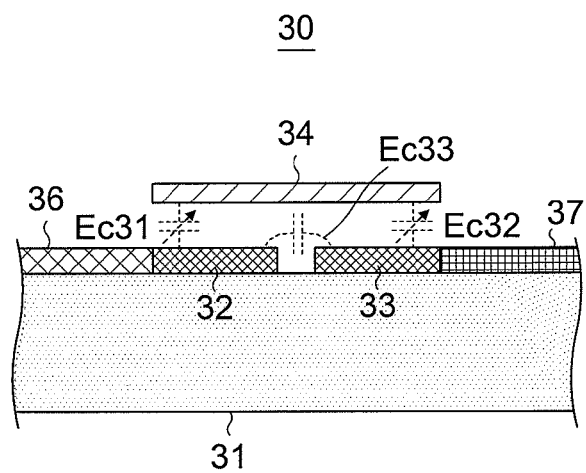
Figure 8A:
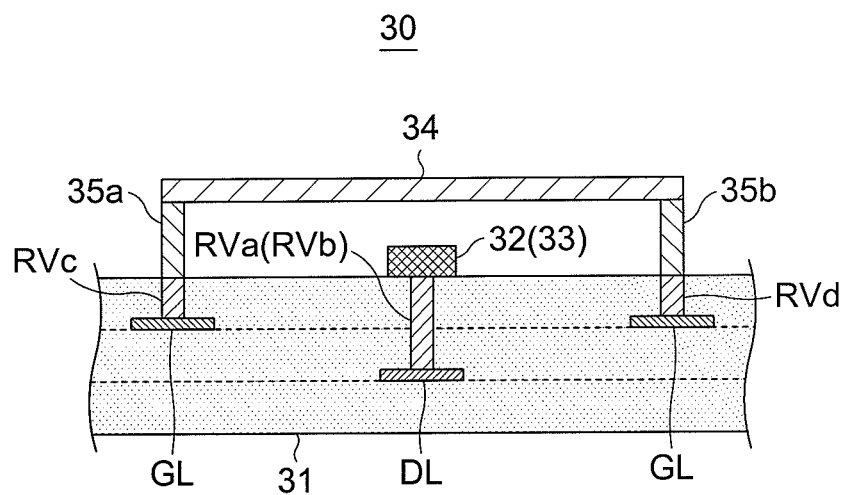
FIGS. 8A and 8B are cross sectional views of the variable capacitor illustrated in FIGS. 7A and 7B.
Figure 8B:
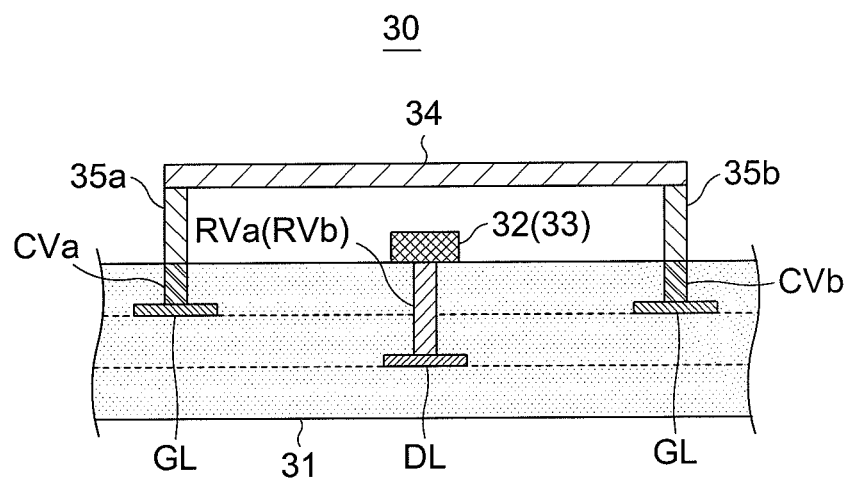

FIG. 7A is a plan view illustrating an example of a variable capacitor 30 according to a third embodiment. FIG. 7B is a cross sectional view of the variable capacitor 30 taken along a line C1-C1 in FIG. 7A, and FIGS. 8A and 8B are cross sectional views of the variable capacitor 30 taken along a line C2-C2 in FIG. 7A.

As illustrated in FIGS. 7A, 7B, 8A, and 8B, the variable capacitor 30 includes, on a substrate 31, a first fixed electrode 32, a second fixed electrode 33, a movable electrode 34, anchor portions 35a and 35b, a first signal line 36, a second signal line 37, and the like.

The substrate 31 is similar to the substrate 11 of the first embodiment.

The first fixed electrode 32 and the second fixed electrode 33 are similar to the fixed electrode 12 of the first embodiment with respect to the formation material, shape, and the like. It is also similar in the respect that end portions of the first signal line 36 and the second signal line 37 may also be used as the first fixed electrode 32 and the second fixed electrode 33, respectively.

The first fixed electrode 32 and the second fixed electrode 33 are arranged so that each side face of these electrodes faces each other across an axis a-a which is a center axis of the variable capacitor 30. To be specific, the first fixed electrode 32 and the second fixed electrode 33 are arranged symmetrically with the axis a-a serving as an axis of symmetry.

The movable electrode 34 is similar to the movable electrode 14 of the first embodiment.

The anchor portions 35a and 35b are basically similar to the anchor portions 15a and 15b of the first embodiment. However, they are formed directly on a surface of the substrate 31.

The first signal line 36 is similar to the first signal line 16 of the first embodiment.

The second signal line 37 is formed on the surface of the substrate 31 in such a manner to extend in a direction identical with a direction in which the first signal line 36 extends, and connected to the second fixed electrode 33.

The variable capacitor 30, as a whole, is symmetrically arranged with the axis a-a serving as an axis of symmetry, and has characteristics on an input side and on an output side which are substantially the same. Accordingly, it is possible to reduce the reflection of the high-frequency signal at the first fixed electrode 30, that is an input end, and also at the second fixed electrode 33, that is an output end.

As illustrated in FIGS. 8A and 8B, the first fixed electrode 32 and the second fixed electrode 33 are connected to the driving line DL individually through the via resistances RVa and RVb which are provided immediately beneath the first fixed electrode 32 and the second fixed electrode 33, respectively, and inside the substrate 31.

To put it differently, the fixed electrode 32 and the driving line DL are connected together by the via resistance RVa in a shortest distance, and the second fixed electrode 33 and the driving line DL are connected together by the via resistances RVb in a shortest distance.

It is also possible to connect only one of the first fixed electrode 32 and the second fixed electrode 33 to the driving line DL through the via resistance RV.

In the first connection pattern illustrated in FIG. 8A, the movable electrode 34 is connected to the ground line GL through the anchor portions 35a and 35b, and through the via resistances RVc and RVd provided immediately beneath the anchor portions 35a and 35b, respectively, and inside the substrate 31.

To put it differently, the anchor portions 35a and 35b, and the ground line GL are connected together by the via resistances RVc and RVd, respectively, in a shortest distance.

In the second connection pattern illustrated in FIG. 8B, the movable electrode 34 is connected to the ground line GL through the anchor portions 35a and 35b, and through the conductor vias CVa and CVb provided beneath the anchor portions 35a and 35b, respectively, and inside the substrate 31.

To put it differently, the anchor portions 35a and 35b, and the ground line GL are connected together by the conductor vias CVa and CVb, respectively, in a shortest distance.

In either of the connection patterns, the first fixed electrode 32, the second fixed electrode 33, and the movable electrode 34 have a role as a driving electrode in addition to a roll as a capacitance electrode of the variable capacitor 30.

FIGS. 9A-11B are diagrams illustrating equivalent circuits of the variable capacitor 30.

Figure 9A:
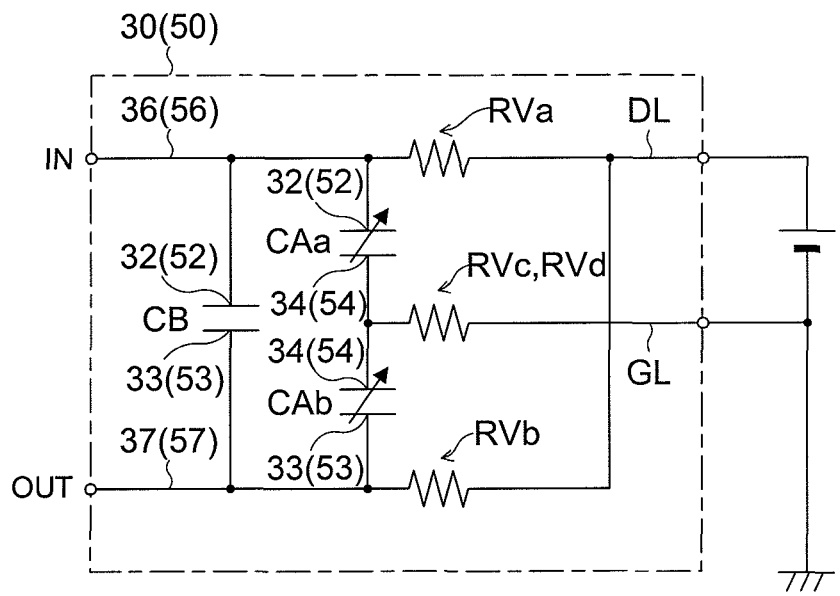
FIGS. 9A and 9B are diagrams illustrating equivalent circuits of the variable capacitor.

The variable capacitor 30 in the first connection pattern can be expressed in a form of the equivalent circuit as illustrated in FIG. 9A.

To be specific, the first fixed electrode 32 is connected to the first signal line 36 and, at the same time, connected to the driving line DL through the via resistance RVa. The second fixed electrode 33 is connected to the second signal line 37 and, at the same time, connected to the driving line DL through the via resistance RVb.

Here, the via resistances RVa is provided in a position immediately beneath the first fixed electrode 32 which is very close to the first fixed electrode 32. The via resistance RVb is provided in a position immediately beneath the second fixed electrode 33 which is very close to the second fixed electrode 33. Therefore, it is possible to efficiently prevent the high-frequency signal from leaking to the driving line DL.

In addition, the movable electrode 34 is connected to the ground line GL through the via resistances RVc and RVd.

Here, the via resistances RVc and RVd are provided in positions immediately beneath the anchor portions 35a and 35b, respectively, which are very close to the movable electrode 34. Therefore, it is possible to efficiently prevent the high-frequency signal from leaking to the ground line GL.

Figure 9B:
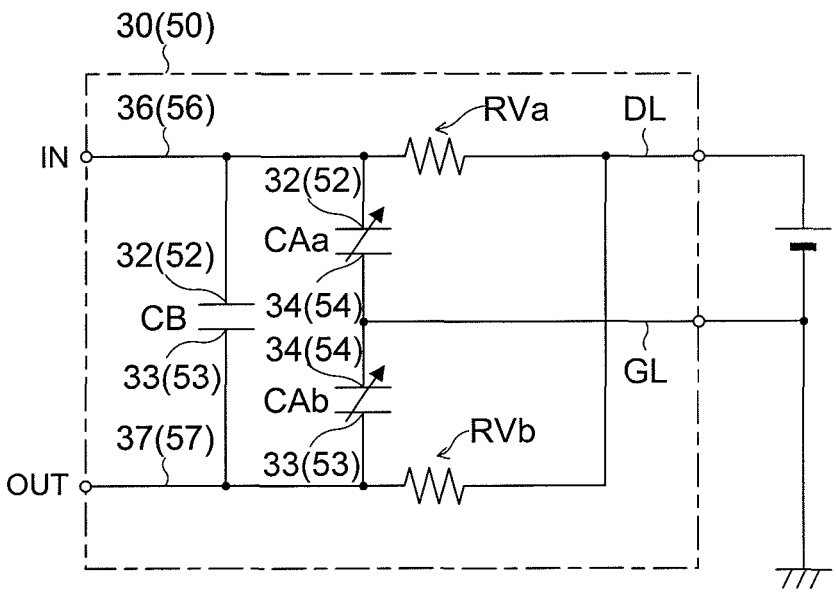

The variable capacitor 30 in the second connection pattern can be expressed in a form of the equivalent circuit as illustrated in FIG. 9B. This means that it can be expressed in a form of the equivalent circuit illustrated in FIG. 9A excluding the via resistances RVc and RVd.

Also, in this case, the via resistances RVa and RVb are provided in positions very close to the first fixed electrode 32 and the second fixed electrode 33, respectively. Therefore, it is possible to efficiently prevent the high-frequency signal from leaking to the driving line DL.

In the variable capacitor 30, a variable capacitance portion CAa having a capacitance Ec31 between the first fixed electrode 32 and the movable electrode 34 is realized. A variable capacitance portion CAb having a capacitance Ec32 between the second fixed electrode 33 and the movable electrode 34 is realized. Further, a fixed capacitance portion CB having a capacitance Ec33 between the first fixed electrode 32 and the second fixed electrode 33 is realized.

When a driving voltage is applied to two fixed electrodes of the first fixed electrode 32 and the second fixed electrode 33 through the driving line DL, an electrostatic attractive force is exerted between the two fixed electrodes and the movable electrode 34. This causes the capacitances Ec31 and Ec32 to change. Accordingly, the capacitances Ec31 and Ec32 are variable capacitances. On the other hand, the capacitance Ec33 is a fixed capacitance.

In this way, the variable capacitor 30 includes a fixed capacitance in addition to the variable capacitance. This means that, in the variable capacitor 30, a variation range of capacitance can be more freely set to obtain a desired impedance value as compared with the variable capacitor 10 of the first embodiment.

The equivalent circuit illustrated in FIG. 9A can be taken as a circuit in which the driving line DL is cut off from the variable capacitance portions CAa and CAb and the fixed capacitance portion CB in terms of high frequency. Based on this, the equivalent circuit illustrated in FIG. 9A can be replaced with the equivalent circuit illustrated in FIG. 10A To be specific, the variable capacitor 30 in the first connection pattern can be expressed in a form of a circuit in which the variable capacitances CAa and CAb are connected in parallel between the signal lines on both sides of the fixed capacitance portion CB and a resistance R connected to the ground. Here, the resistance R is a combined resistance of the via resistances RVc and RVd.

Figure 10A:
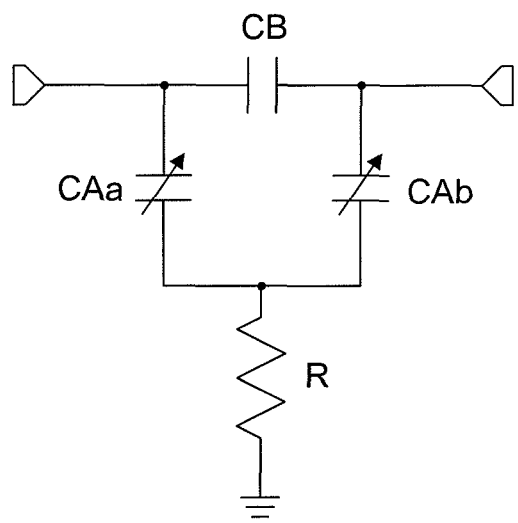
FIGS. 10A and 10B are diagrams illustrating equivalent circuits of the variable capacitor.
Figure 10B:
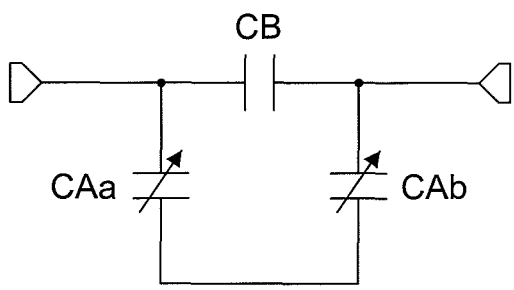

When a resistance value of the resistance R is sufficiently large, for example, 500 ohms or larger, the equivalent circuit illustrated in FIG. 10A can be replaced with the equivalent circuit illustrated in FIG. 10B.

This means that the variable capacitor 30 in the first connection pattern can be expressed in a form of a circuit in which the variable capacitance portions CAa and CAb are connected in parallel to the fixed capacitance portion CB.

Figure 11A:
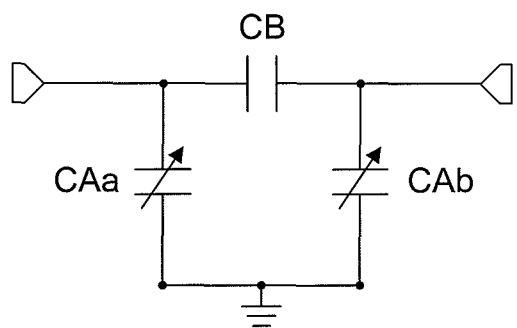
FIGS. 11A and 11B are diagrams illustrating equivalent circuits of the variable capacitor.

Further, the equivalent circuit illustrated in FIG. 9B can be replaced with a n-type equivalent circuit illustrated in FIG. 11A.

In other words, the variable capacitor 30 in the second connection pattern can be expressed in a form of a circuit in which the variable capacitance portions CAa and CAb are connected in parallel between signal lines on both sides of the fixed capacitance portion CB, and the ground.

Figure 11B:
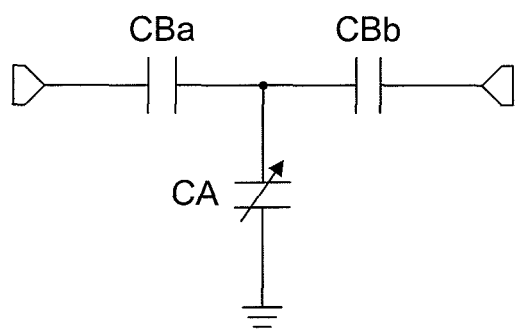

Furthermore, the n-type equivalent circuit illustrated in FIG. 11A can be replaced with a T-type equivalent circuit illustrated in FIG. 11B.

This means that the variable capacitor 30 in the second connection pattern can be expressed in a form of a circuit in which the variable capacitance portion CA is connected to a connection point between the fixed capacitance portions CBa and CBb, and the ground.

In this embodiment, the first fixed electrode 32 and the second fixed electrode 33 are connected to the driving line DL through the via resistance RV, and the movable electrode 34 is connected to the ground line GL through the via resistance RV or the conductor via CV. However, such connections can be made the other way around. In other words, it is also possible to connect the movable electrode 34 to the driving line DL through the via resistance RV, and connect the first fixed electrode 32 and the second fixed electrode 33 to the ground line GL through the via resistance RV or the conductor via CV.

Fourth Embodiment

Figure 12A:
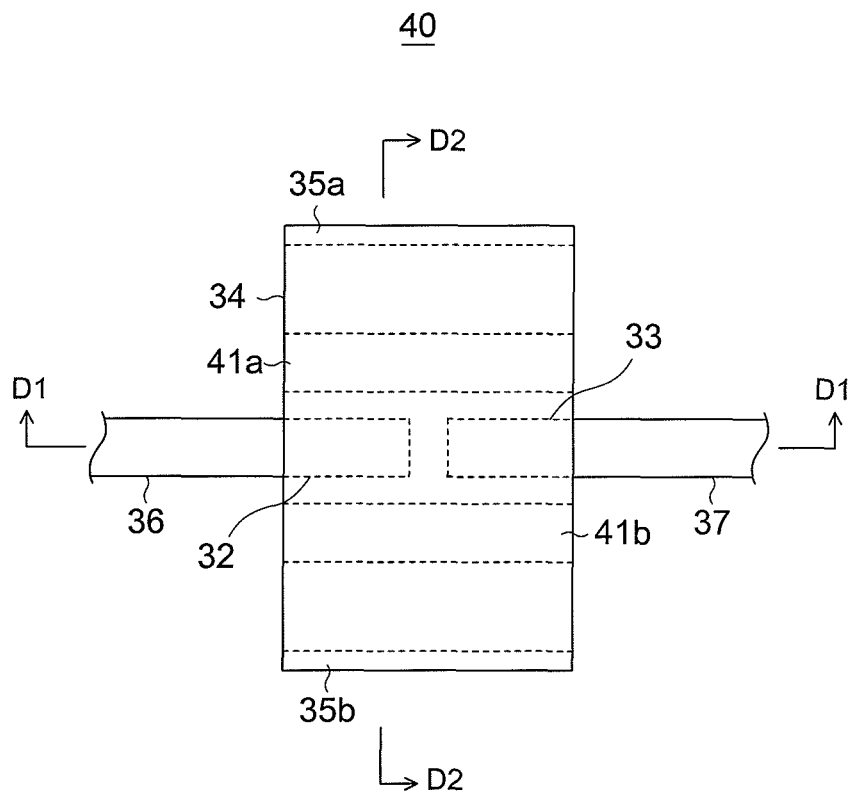
FIGS. 12A and 12B are a plan view and a cross sectional view, respectively, of an example of a variable capacitor according to a fourth embodiment.
Figure 12B:
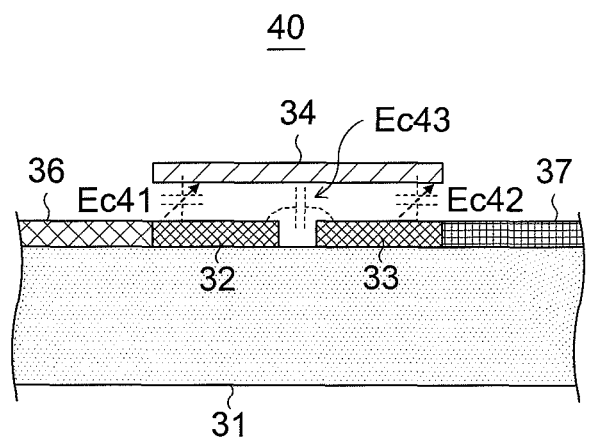
Figure 13A:
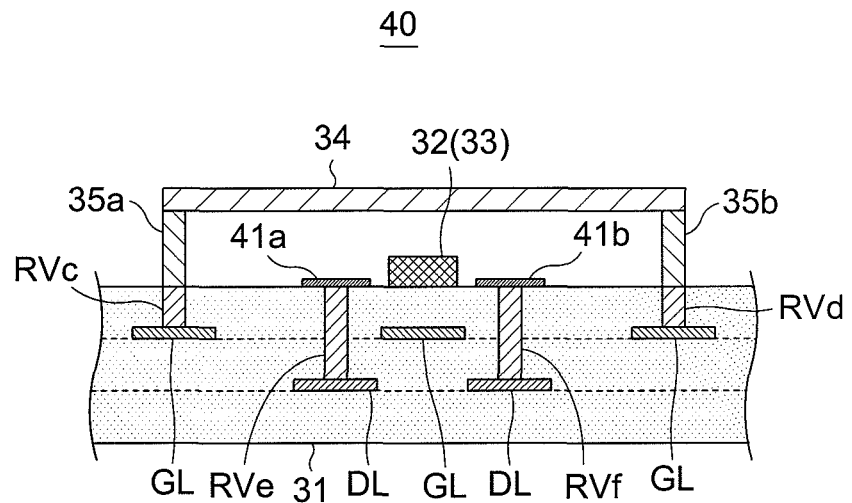
FIGS. 13A and 13B are cross sectional views of the variable capacitor illustrated in FIGS. 12A and 12B.
Figure 13B:
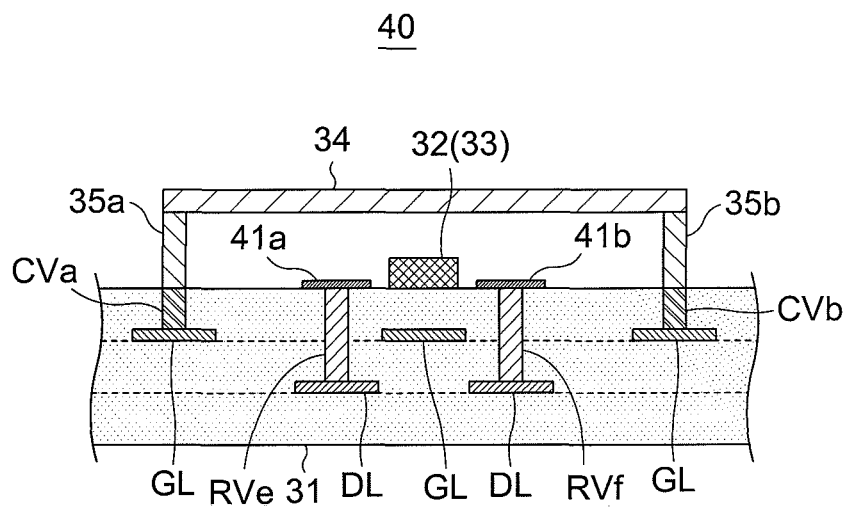

FIG. 12A is a plan view illustrating an example of a variable capacitor 40 according to a fourth embodiment. FIG. 12B is a cross sectional view of the variable capacitor 40 taken along a line D1-D1 in FIG. 12A, and FIGS. 13A and 13B are cross sectional views of the variable capacitor 40 taken along a line D2-D2 in FIG. 12A.

As illustrated in FIGS. 12A-13B, in the variable capacitor 40, driving electrodes 41a and 41b are separately provided in addition to the first fixed electrode 32 and the second fixed electrode 33. In other words, the variable capacitor 40 is different from the variable capacitor 30 of the third embodiment in the respect that it is a separate driving type.

Specifically, the first fixed electrode 32 and the second fixed electrode 33 are not connected to a driving line DL, but the driving electrodes 41a and 41b are connected to the driving line DL through via resistances RVe and RVf, respectively. Accordingly, the via resistances RVa and RVb provided in the variable capacitor 30 are no longer required in the variable capacitor 40, and thus are not provided.

The other constitutional elements of the variable capacitor 40 are the same as those used in the variable capacitor 30 of the third embodiment.

The driving electrodes 41a and 41b are similar to the driving electrodes 21a and 21b of the second embodiment, respectively. In other words, they are provided close to two sides of the first fixed electrode 32 and the second fixed electrode 33.

As illustrated in FIGS. 13A and 13B, the driving electrodes 41a and 41b are connected to the driving line DL through the via resistances RVe and RVf provided immediately beneath the driving electrodes 41a and 41b, respectively, and inside the substrate 31.

To put it differently, the driving electrode 41a and the driving line DL are connected together by the via resistance RVe in a shortest distance, and the driving electrode 41b and the driving line DL are connected together by the via resistances RVf in a shortest distance.

FIG. 13A illustrates a first connection pattern, and FIG. 13B illustrates a second connection pattern.

In either of the connection patterns, the first fixed electrode 32 and the second fixed electrode 33 have a function as capacitance electrodes of the variable capacitor 40, but do not have a function as driving electrodes. On the other hand, the movable electrode 34 has not only a function as a capacitance electrode of the variable capacitor 40 but also a function as a driving electrode.

Figure 14A:
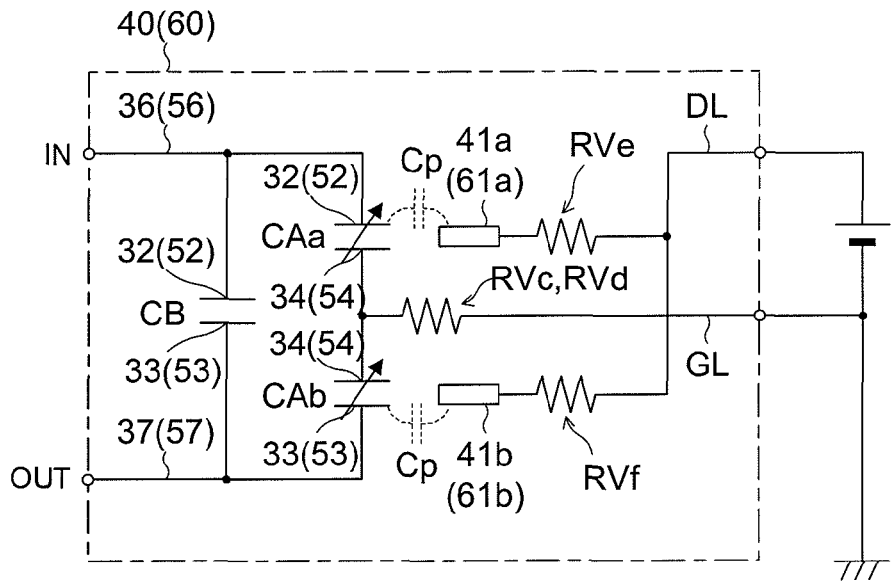
FIGS. 14A and 14B are diagrams illustrating equivalent circuits of the variable capacitor.
Figure 14B:
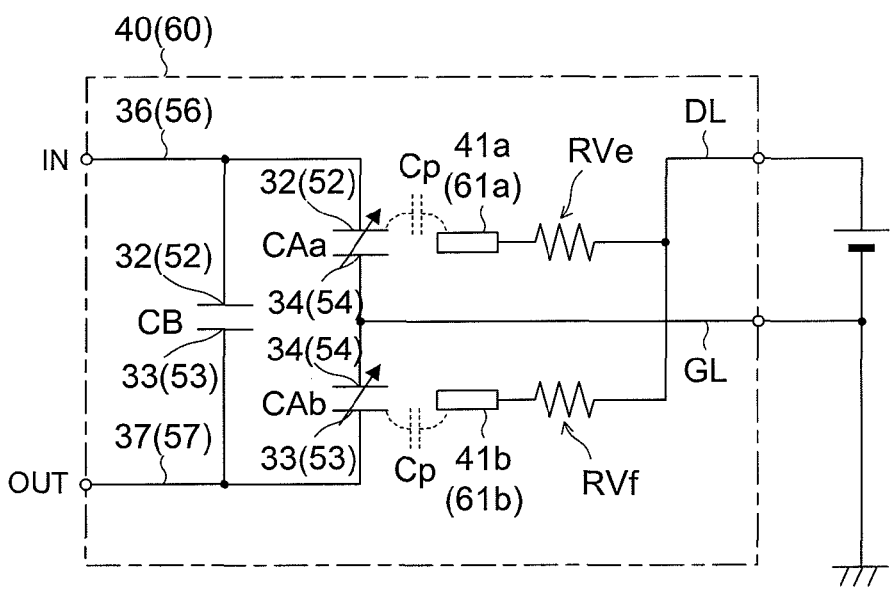

FIGS. 14A and 14B are diagrams illustrating equivalent circuits of the variable capacitor 40.

The variable capacitor 40 in the first connection pattern is expressed in a form of the equivalent circuit as illustrated in FIG. 14A.

Specifically, the movable electrode 34 is connected to the ground line GL through the via resistances RVc and RVd.

Here, the via resistances RVc and RVd are provided in positions immediately beneath the anchor portions 35a and 35b, respectively, which are very close to the movable electrode 34. Therefore, it is possible to efficiently prevent the high-frequency signal from leaking to the ground line GL.

Referring to FIGS. 13A and 13B, the driving electrodes 41a and 41b are arranged close to the first fixed electrode 32 and the second fixed electrode 33, respectively, so as to act upon the movable electrode 14, and is connected to the driving line DL through the via resistances RVe and RVf.

Here, the via resistances RVe and RVf are provided very close to the driving electrodes 41a and 41b, respectively, that is, immediately beneath the driving electrodes 41a and 41b. Therefore, it is possible to efficiently prevent the high-frequency signal from leaking to the ground line GL even if the parasitic capacitance Cp is present between the driving electrodes 41a and 41b and the peripheral circuits, particularly, between the driving electrodes 41a and 41b, and the first fixed electrode 32 and the second fixed electrode 33 which are arranged close to the driving electrodes 41a and 41b.

The variable capacitor 40 in the second connection pattern can be expressed in a form of the equivalent circuit as illustrated in FIG. 14B. This means that it can be expressed in a form of the equivalent circuit illustrated in FIG. 14A excluding the via resistances RVc and RVd.

Also, in this case, the via resistances RVe and RVf are provided in positions very close to the driving electrodes 41a and 41b, respectively. Therefore, it is possible to efficiently prevent the high-frequency signal from leaking to the driving line DL.

In the variable capacitor 40, a variable capacitance portion CAa having a capacitance Ec41, a variable capacitance portion CAb having a capacitance Ec42, and a fixed capacitance portion CB having a capacitance Ec43 can also be realized as in the case of the variable capacitor 30 of the third embodiment.

The equivalent circuit of the variable capacitor 40 in the first connection pattern illustrated in FIG. 14A can be replaced with the equivalent circuit illustrated in FIGS. 10A and 10B in terms of the high frequency as in the case of the variable capacitor 30.

The variable capacitor 40 in the second connection pattern illustrated in FIG. 14B can also be replaced with the equivalent circuit illustrated in FIGS. 11A and 11B in terms of the high frequency as in the case of the variable capacitor 30.

Fifth Embodiment

Figure 15:
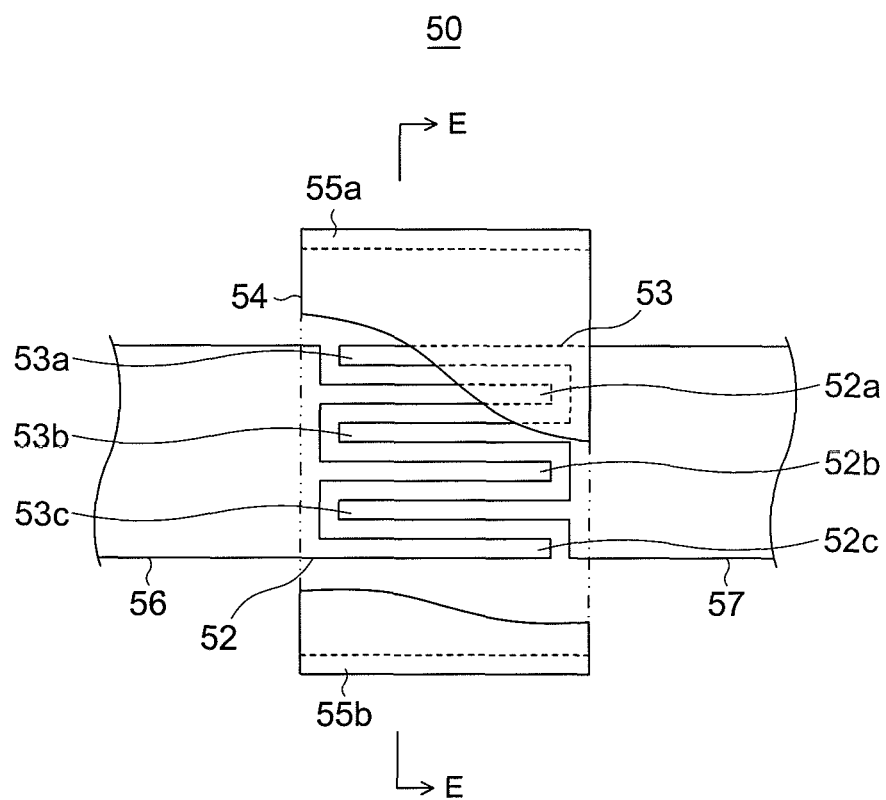
FIG. 15 is a plan view illustrating an example of a variable capacitor according to a fifth embodiment.
Figure 16A:
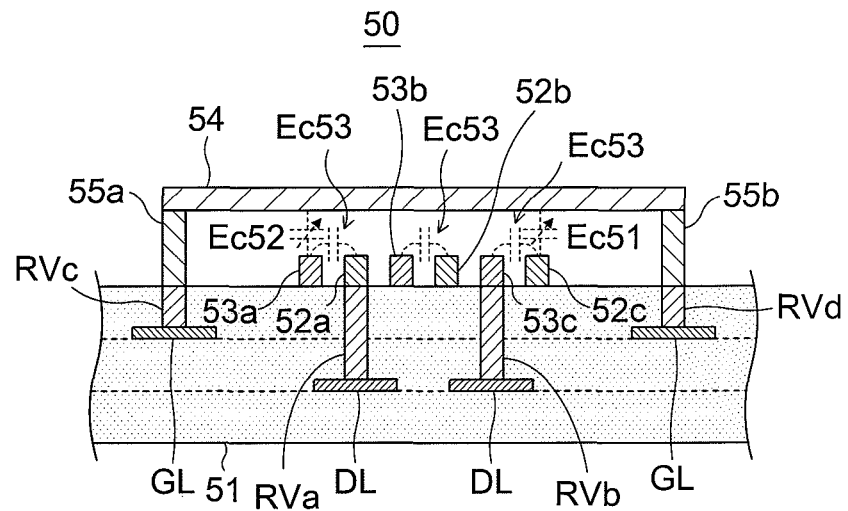
FIGS. 16A and 16B are cross sectional views of the variable capacitor illustrated in FIG. 15.
Figure 16B:
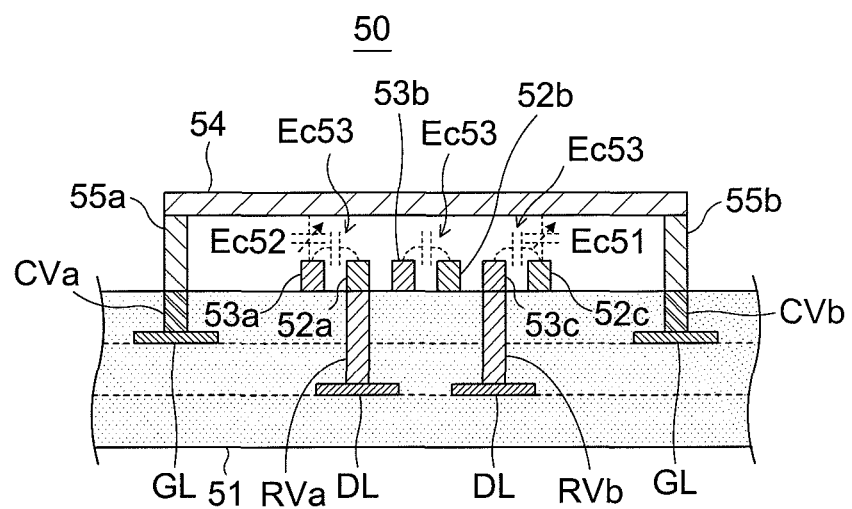

FIG. 15 is a plan view illustrating an example of a variable capacitor 50 according to a fifth embodiment. FIGS. 16A and 16B are cross sectional views of the variable capacitor 50 taken along a line E-E in FIG. 15.

As illustrated in FIGS. 15, 16A, and 16B, the variable capacitor 50 includes, on a substrate 51, a first fixed electrode 52, a second fixed electrode 53, a movable electrode 54, anchor portions 55a and 55b, a first signal line 56, a second signal line 57, and the like.

The substrate 51 is similar to the substrate 31 of the third embodiment.

The first fixed electrode 52 and the second fixed electrode 53 are similar to the fixed electrode 32 and the second fixed electrode 33 of the third embodiment, respectively, with respect to the formation material etc. It is also similar that end portions of the first signal line 56 and the second signal line 57 may also be used as the first fixed electrode 52 and the second fixed electrode 53, respectively.

The first fixed electrode 52 and the second fixed electrode 53 are individually provided with first comb-tooth portions 52a-52c and second comb-tooth portions 53a-53c, and are arranged in a manner that individual first and second comb-tooth portions are alternately placed side by side with a predetermined distance provided between each other. In this embodiment, three comb-tooth portions are provided individually. However, two, four, or more comb-tooth portions may be provided individually.

The first fixed electrode 52 and the second fixed electrode 53 are arranged symmetrically with respect to a center point.

The movable electrode 54 and the anchor portions 55a and 55b are similar to the movable electrode 34 and the anchor portions 35a and 35b, respectively, of the third embodiment.

The first signal line 56 and the second signal line 57 are basically similar to the first signal line 36 and the second signal line 37 of the third embodiment, respectively. However, the widths of the lines are made slightly larger in this embodiment.

The variable capacitor 50, as a whole, is arranged to be symmetric with respect to a center point thereof, and has characteristics on an input side and on an output side which are substantially the same as in the case of the variable capacitor 30 of the third embodiment. Accordingly, in the variable capacitor 50, it is also possible to reduce the reflection of the high-frequency signal.

As illustrated in FIGS. 16A and 16B, the first comb-tooth portion 52a is connected to the driving line DL through the via resistance RVa provided immediately beneath the first comb-tooth portion 52a and inside the substrate 51.

In other words, the first comb-tooth portion 52a and the driving line DL is connected together by the via resistance RVa.

Alternatively, another first comb-tooth portion 52b or 52c may be connected to the driving line DL instead of the first comb-tooth portion 52a, or all of the first comb-tooth portions 52a-52c may be connected to the driving line DL.

The second comb-tooth portion 53c is connected to the driving line DL through the via resistance RVb provided immediately beneath the second comb-tooth portion 53c and inside the substrate 51.

To put it differently, the second comb-tooth portion 53c and the driving line DL are connected together by the via resistance RVb and in a shortest distance.

However, the second comb-tooth portion 53a or 53b may be connected to the driving line DL instead of the second comb-tooth portion 53c, or all of the second comb-tooth portions 53a-53c may be connected to the driving line DL.

Ultimately, at least one of the first comb-tooth portions 52a-52c and the second comb-tooth portions 53a-53c may be connected to the driving line DL.

In the first connection pattern illustrated in FIG. 16A, the movable electrode 54 is connected to the ground line GL through the anchor portions 55a and 55b, and the via resistances RVc and RVd provided immediately beneath the anchor portions 55a, respectively, and in the substrate 51.

In the second connection pattern illustrated in FIG. 162, the movable electrode 54 is connected to the ground line GL through the anchor portions 55a and 55b, and the conductor vias CVa and CVb provided immediately beneath the anchor portions 55a and 55b, respectively, and in the substrate 51.

In either of the connection patterns, the first fixed electrode 52, the second fixed electrode 53, and the movable electrode 54 have a function as driving electrodes in addition to a function as capacitance electrodes of the variable capacitor 50.

The variable capacitor 50 in the case of the first connection pattern can be expressed, as in the case of the variable capacitor 30 of the third embodiment, in a form of the equivalent circuit as illustrated in FIG. 9A.

Also, in this case, the via resistances RVa and RVb are provided in positions very close to the first fixed electrode 52 and the second fixed electrode 53, respectively. Therefore, it is possible to efficiently prevent the high-frequency signal from leaking to the driving line DL.

Also, the via resistances RVc and RVd are provided in positions very close to the movable electrode 54. Therefore, it is possible to efficiently prevent the high-frequency signal from leaking to the ground line GL.

The variable capacitor 50 in the case of the second connection pattern can also be expressed, as in the case of the variable capacitor 30 of the third embodiment, in a form of the equivalent circuit as illustrated in FIG. 9B.

Also, in this case, the via resistances RVa and RVb are provided in positions very close to the first fixed electrode 52 and the second fixed electrode 53, respectively. Therefore, it is possible to efficiently prevent the high-frequency signal from leaking to the driving line DL.

In the variable capacitor 50, a variable capacitance portion CAa having a capacitance Ec51 is realized between the first fixed electrode 52 and the movable electrode 54. A variable capacitance portion CAb having a capacitance Ec52 is realized between the second fixed electrode 53 and the movable electrode 54.

Further, fixed capacitance portions CB each having capacitances Ec53 are realized individually between the first comb-tooth portion 52a and the second comb-tooth portion 53a, the first comb-tooth portion 52b and the second comb-tooth portion 53b, and the first comb-tooth portion 52c and the second comb-tooth portion 53c. This means that the first fixed electrode 52 and the second fixed electrode 53 form so-called fixed interdigital capacitors, and the capacitances Ec53 are realized between individual comb-tooth portions that are adjacent to each other.

When a driving voltage is applied between the first comb-tooth portion 52a and the second comb-tooth portion 53a through the driving line DL, an electrostatic attractive force is exerted between the movable electrode 54 and the first fixed electrode 52 as well as the second fixed electrode 53. This causes the capacitances Ec51 and Ec52 to change. Accordingly, the capacitances Ec51 and Ec52 are variable capacitances. On the other hand, the capacitance Ec53 is a fixed capacitance.

In this way, the variable capacitor 50 includes the fixed capacitance in addition to the variable capacitance. In addition, it is possible for the variable capacitor 50 to have a capacitance according to the number of comb-tooth portions of the first fixed electrode 52 and the second fixed electrode 53. For example, the more the number of the comb-tooth portions is provided, the larger the value of the fixed resistance is made. This means that, in the variable capacitor 50, a variation range of capacitance can be more freely set to obtain a desired impedance value as compared with the variable capacitor 30 of the third embodiment.

The equivalent circuit of the variable capacitor 50 in the first connection pattern illustrated in FIG. 9A can be replaced with the equivalent circuit illustrated in FIGS. 10A and 10B in terms of the high frequency as in the case of the variable capacitor 30.

The variable capacitor 50 in the second connection pattern illustrated in FIG. 9B can also be replaced with the equivalent circuit illustrated in FIGS. 11A and 11B in terms of the high frequency as in the case of the variable capacitor 30.

In this embodiment, the first fixed electrode 52 and the second fixed electrode 53 are connected to the driving line DL through the via resistance RV, and the movable electrode 54 is connected to the ground line GL through the via resistance RV or the conductor via CV. However, such connections can be made the other way around. In other words, it is also possible to connect the movable electrode 54 to the driving line DL through the via resistance RV and the fixed electrode 52, and connect the first fixed electrode 52 and the second fixed electrode 53 to the ground line GL through the via resistance RV or the conductor via CV.

Sixth Embodiment

Figure 17:
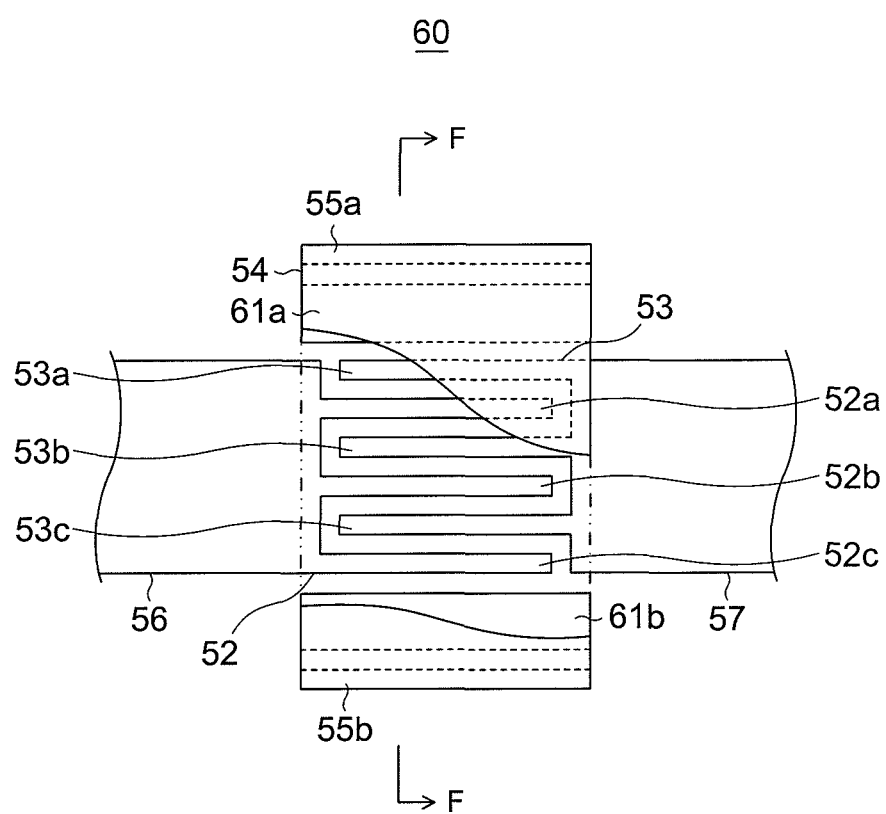
FIG. 17 is a plan view illustrating an example of a variable capacitor according to a sixth embodiment.
Figure 18A:
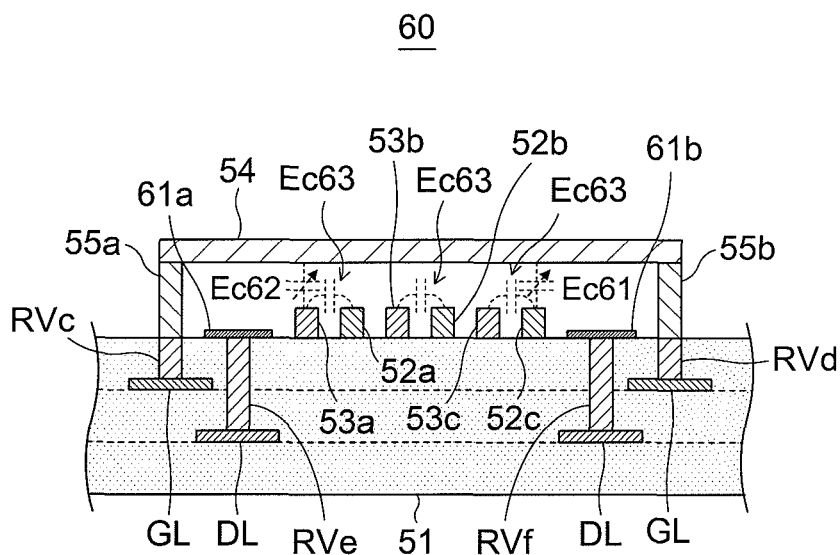
FIGS. 18A and 18B are cross sectional views of the variable capacitor illustrated in FIG. 17.
Figure 18B:
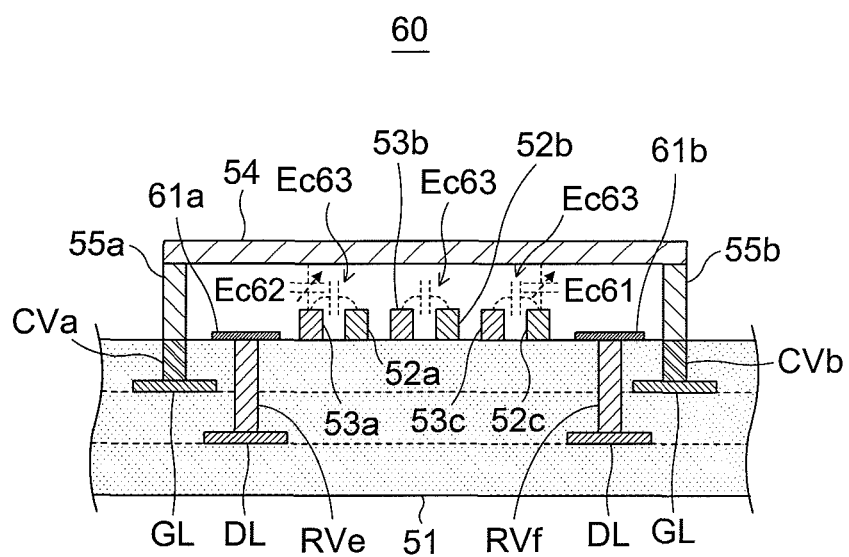

FIG. 17 is a plan view illustrating an example of a variable capacitor 60 according to a sixth embodiment. FIGS. 18A and 18B are cross sectional views of the variable capacitor 60 taken along a line F-F in FIG. 17.

As illustrated in FIGS. 17, 18A, and 18B, in the variable capacitor 60, driving electrodes 61a and 61b are separately provided in addition to the first fixed electrode 52 and the second fixed electrode 53. In other words, the variable capacitor 60 is different from the variable capacitor 50 of the fifth embodiment in the respect that it is a separate driving type.

Specifically, the first fixed electrode 52 and the second fixed electrode 53 are not connected to a driving line DL, but the driving electrodes 61a and 61b are connected to the driving line DL through via resistances RVe and RVf, respectively. Accordingly, the via resistances RVa and RVb provided in the variable capacitor 50 are no longer required in the variable capacitor 60, and thus are not provided.

The other constitutional elements of the variable capacitor 60 are the same as those used in the variable capacitor 50 of the fifth embodiment.

The driving electrodes 61a and 61b are similar to the driving electrodes 21a and 21b of the second embodiment, respectively. In other words, they are provided close to two sides of the first fixed electrode 52 and the second fixed electrode 53.

As illustrated in FIGS. 18A and 183, the driving electrodes 61a and 61b are connected to the driving line DL through the via resistances RVe and RVf provided immediately beneath the driving electrodes 61a and 61b, respectively, and inside the substrate 51.

To put it differently, the driving electrode 61a and the driving line DL are connected together by the via resistance RVe in a shortest distance, and the driving electrode 61b and the driving line DL are connected together by the via resistances RVf in a shortest distance.

FIG. 18A illustrates a first connection pattern, and FIG. 18B illustrates a second connection pattern.

In either of the connection patterns, the first fixed electrode 52 and the second fixed electrode 53 have a function as capacitance electrodes of the variable capacitor 60, but do not have a function as driving electrodes. On the other hand, the movable electrode 54 has not only a function as a capacitance electrode of the variable capacitor 60 but also as a driving electrode.

The variable capacitor 60 in the case of the first connection pattern can be expressed, as in the case of the variable capacitor 40 of the fourth embodiment, in a form of the equivalent circuit as illustrated in FIG. 14A.

Also, in this case, the via resistances RVe and RVf are provided in positions very close to the driving electrodes 61a and 61b, respectively. Therefore, it is possible to efficiently prevent the high-frequency signal from leaking to the driving line DL.

Also, the via resistances RVc and RVd are provided in positions very close to the movable electrode 54. Therefore, it is possible to efficiently prevent the high-frequency signal from leaking to the ground line GL.

The variable capacitor 60 in the case of the second connection pattern can be expressed, as in the case of the variable capacitor 40 of the fourth embodiment, in a form of the equivalent circuit as illustrated in FIG. 14B.

Also, in this case, the via resistances RVe and RVf are provided in positions very close to the driving electrodes 61a and 61b, respectively. Therefore, it is possible to efficiently prevent the high-frequency signal from leaking to the driving line DL.

In the variable capacitor 60, a variable capacitance portion CAa having a capacitance Ec61, a variable capacitance portion CAb having a capacitance Ec62, and a fixed capacitance portion CB having a capacitance Ec63 can also be realized as in the case of the variable capacitor 50 of the fifth embodiment.

The equivalent circuit of the variable capacitor 60 in the first connection pattern illustrated in FIG. 14A can be replaced with the equivalent circuit illustrated in FIGS. 10A and 10B in terms of the high frequency as in the case of the variable capacitor 40.

The variable capacitor 60 in the second connection pattern illustrated in FIG. 14B can also be replaced with the equivalent circuit illustrated in FIGS. 11A and 11B in terms of the high frequency as in the case of the variable capacitor 40.

Figure 19:
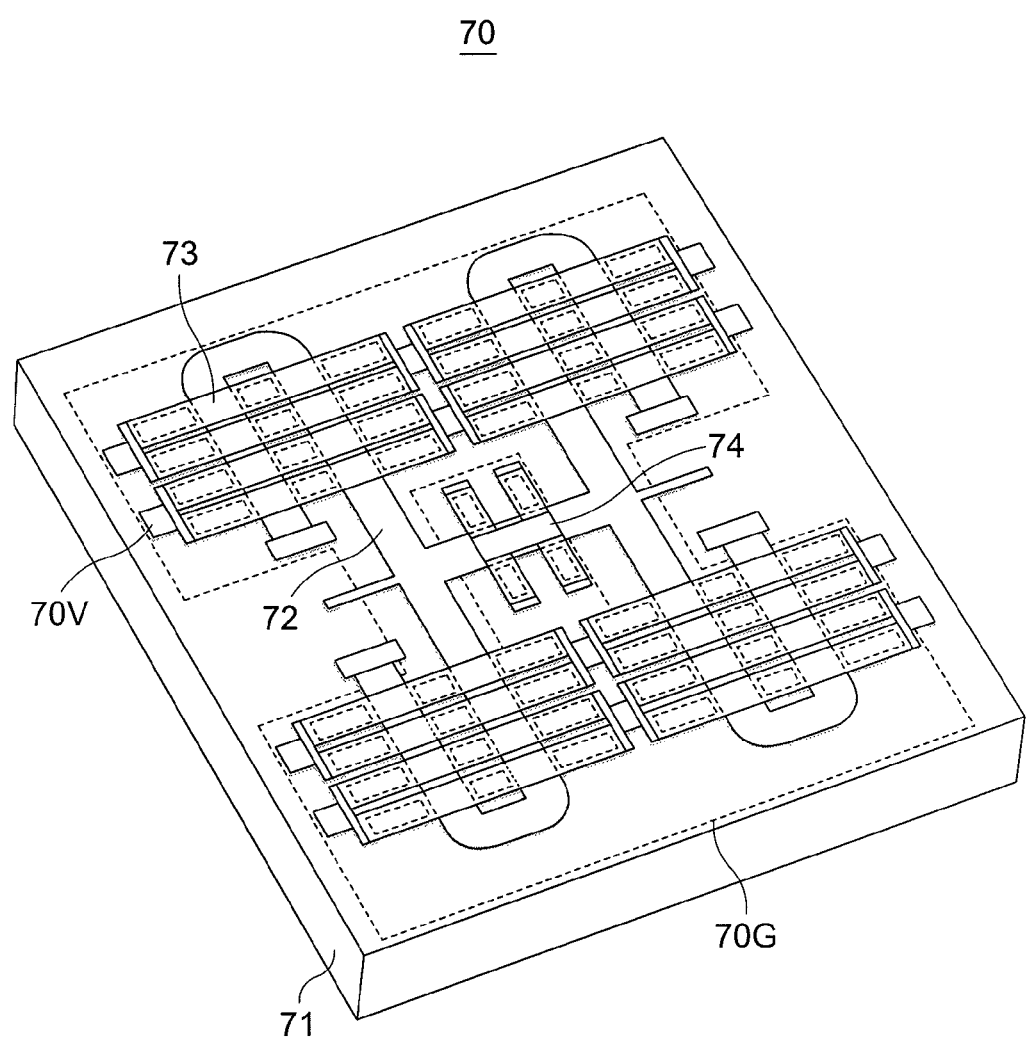
FIG. 19 is a perspective view illustrating an example of a variable capacitor.

FIG. 19 is a perspective view illustrating a variable filter 70.

As illustrated in FIG. 19, the variable filter 70 includes a substrate 71, a microstrip line 72 as a distributed constant line, a variable resonance portion 73, a variable coupling portion 74, and the like. The variable filter 70 also includes, inside the substrate 71, an in-layer ground 70G and vias 70V.

The variable capacitors 10-60 can be applied, for example, to the variable coupling portion 74. In such a case, the microstrip line 72 is connected to the fixed electrode or the movable electrode of any of the variable capacitors 10-60. Here, it is possible to appropriately adjust a propagation length, a pass frequency, or the like of a high-frequency signal.

In the variable capacitors 10-60 according to the embodiments described above, the structure, shape, material, and the like of the entirety or individual portions thereof may be altered as required in accordance with the subject matter of the present invention.

For example, in the variable capacitors 10-60, an input signal line and an output signal line are provided in a one-to-one manner. However, the input signal line and the output signal line may be provided in a one-to-multiline manner or a multiline-to-multiline manner. In that case, each signal line is provided with a corresponding fixed electrode or the like. With this arrangement, it is possible to provide a function as a branch filter to the variable capacitors 10-60.

The configuration, structure, and the like of the via resistances etc. can be widely applied not only to the variable capacitors but also to various types of MEMS devices that are required to prevent a loss in the high-frequency signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A MEMS device comprising:
   a substrate;
   a fixed electrode that is disposed on the substrate, and allows signal to pass therethrough;

a movable electrode that is disposed above the substrate in a manner to face the fixed electrode, and allows signal to pass therethrough;

a driving line that is disposed inside the substrate and is connected to apply a driving voltage to displace the movable electrode;

a first resistance that is disposed in a first via hole formed inside the substrate and is usable to cut off a signal; and a driving electrode that is disposed on the substrate facing the movable electrode and is connected to the driving line through the first resistance;

wherein the fixed electrode includes a first fixed electrode and a second fixed electrode, the first fixed electrode and the second fixed electrode include a plurality of comb-tooth portions individually, and the plurality of comb-tooth portions of the first fixed electrode and the plurality of comb-tooth portions of the second fixed electrode are arranged alternately next to each other.

2. The MEMS device according to claim 1, wherein the first resistance is formed immediately beneath the driving electrode.

3. The MEMS device according to claim 1, wherein the movable electrode is connected to a ground line through a second resistance that is disposed in a second via hole formed inside the substrate, and is used to cutoff a signal.

4. The MEMS device according to claim 1, wherein the first fixed electrode and the second fixed electrode include individual side faces thereof facing each other.

* * * * *